United States Patent
Kolchinsky et al.

(10) Patent No.: US 11,875,199 B2
(45) Date of Patent: Jan. 16, 2024

(54) REAL-TIME MULTI-PATTERN DETECTION OVER EVENT STREAMS

(71) Applicant: TECHNION RESEARCH & DEVELOPMENT FOUNDATION LIMITED, Haifa (IL)

(72) Inventors: Ilya Kolchinsky, Ashdod (IL); Assaf Schuster, Haifa (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 107 days.

(21) Appl. No.: 17/420,834

(22) PCT Filed: Jan. 7, 2020

(86) PCT No.: PCT/IL2020/050018
§ 371 (c)(1),
(2) Date: Jul. 6, 2021

(87) PCT Pub. No.: WO2020/144676
PCT Pub. Date: Jul. 16, 2020

(65) Prior Publication Data
US 2022/0091909 A1    Mar. 24, 2022

Related U.S. Application Data

(60) Provisional application No. 62/789,017, filed on Jan. 7, 2019.

(51) Int. Cl.
*G06F 9/54* (2006.01)
*G06F 9/445* (2018.01)

(52) U.S. Cl.
CPC .......... *G06F 9/542* (2013.01); *G06F 9/44536* (2013.01)

(58) Field of Classification Search
CPC ..................................................... G06F 9/542
USPC ............................................................ 719/318
See application file for complete search history.

(56) References Cited

U.S. PATENT DOCUMENTS

| | | | |
|---|---|---|---|
| 9,305,238 B2 * | 4/2016 | Srinivasan | G06F 18/00 |
| 9,934,279 B2 * | 4/2018 | Kali | G06F 16/24558 |
| 9,953,056 B2 * | 4/2018 | Zhang | G06F 16/24542 |
| 9,992,269 B1 * | 6/2018 | Odom | G06F 16/24568 |
| 10,838,782 B2 * | 11/2020 | Liongosari | G06F 9/542 |

(Continued)

*Primary Examiner* — Andy Ho
(74) *Attorney, Agent, or Firm* — The Roy Gross Law Firm, LLC; Roy Gross

(57) ABSTRACT

A system comprising: at least one hardware processor; and a non-transitory computer-readable storage medium having stored thereon program instructions, the program instructions executable by the at least one hardware processor to: receive a data stream representing events; receive a plurality of complex event patterns (CEPs) comprising (a) a set of conditions reflecting relations among said events, and (b) a set of attributes associated with each of said events; and calculate an optimal multi-pattern evaluation plan corresponding to said CEPs by: (i) generating an initial evaluation plan, (ii) applying a search method to calculate modified versions of said initial evaluation plan, (iii) assigning a score to each of said modified versions based on a cost function, and (iv) selecting one of said modified versions having a highest said score as said optimal multi-pattern evaluation plan.

18 Claims, 21 Drawing Sheets

(56) References Cited

U.S. PATENT DOCUMENTS

| | | | |
|---|---|---|---|
| 11,086,694 B2 * | 8/2021 | Gupta | G06F 16/2228 |
| 2009/0287628 A1 * | 11/2009 | Indeck | G06F 16/24544 |
| | | | 706/47 |
| 2014/0324530 A1 * | 10/2014 | Thompson | G06Q 30/0201 |
| | | | 705/7.29 |
| 2016/0063057 A1 * | 3/2016 | Ziekow | G06N 5/025 |
| | | | 707/713 |

* cited by examiner

REAL-TIME MULTI-PATTERN DETECTION OVER EVENT STREAMS

CROSS REFERENCE TO RELATED APPLICATIONS

This application is a National Phase of PCT Patent Application No. PCT/IL2020/050018 having International filing date of Jan. 7, 2020, which claims the benefit of priority of U.S. Provisional Patent Application No. 62/789,017, filed Jan. 7, 2019, the contents of which are all incorporated herein by reference in their entirety.

BACKGROUND

This invention relates to the field of computerized complex event processing.

Rapid advances in data-driven applications over recent years have intensified the need for efficient mechanisms capable of monitoring and detecting arbitrarily complex patterns in massive data streams. This task is usually performed by complex event processing (CEP) systems. CEP engines are required to process hundreds or even thousands of user-defined patterns in parallel under tight real-time constraints. To enhance the performance of this crucial operation, multiple techniques have been developed, utilizing well-known optimization approaches such as pattern rewriting and sharing common subexpressions. However, the scalability of these methods is limited by the high computation overhead, and the quality of the produced plans is compromised by ignoring significant parts of the solution space.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provide, in an embodiment, a system comprising: at least one hardware processor; and a non-transitory computer-readable storage medium having stored thereon program instructions, the program instructions executable by the at least one hardware processor to: receive, as input, a data stream representing events; receive, as input, a plurality of complex event patterns (CEPs), each representing an occurrence of a respective CEP in said data stream, wherein each of said CEPs comprises (a) a set of conditions reflecting relations among said events, and (b) a set of attributes associated with each of said events; and calculate an optimal multi-pattern evaluation plan corresponding to said plurality of CEPs, wherein said multi-pattern evaluation plan is created by: (i) generating an initial evaluation plan, (ii) applying a search method to calculate modified versions of said initial evaluation plan, (iii) assigning a score to each of said modified versions based on a cost function, and (iv) selecting one of said modified versions having a highest said score as said optimal multi-pattern evaluation plan.

There is also provided, in an embodiment, a method comprising: receiving, as input, a data stream representing events; receiving, as input, a plurality of complex event patterns (CEPs), each representing an occurrence of a respective CEP in said data stream, wherein each of said CEPs comprises (a) a set of conditions reflecting relations among said events, and (b) a set of attributes associated with each of said events; and calculating an optimal multi-pattern evaluation plan corresponding to said plurality of CEPs, wherein said multi-pattern evaluation plan is created by: (i) generating an initial evaluation plan, (ii) applying a search method to calculate modified versions of said initial evaluation plan, (iii) assigning a score to each of said modified versions based on a cost function, and (iv) selecting one of said modified versions having a highest said score as said optimal multi-pattern evaluation plan.

There is further provided, in an embodiment, a computer program product comprising a non-transitory computer-readable storage medium having program instructions embodied therewith, the program instructions executable by at least one hardware processor to: receive, as input, a data stream representing events; receive, as input, a plurality of complex event patterns (CEPs), each representing an occurrence of a respective CEP in said data stream, wherein each of said CEPs comprises (a) a set of conditions reflecting relations among said events, and (b) a set of attributes associated with each of said events; and calculate an optimal multi-pattern evaluation plan corresponding to said plurality of CEPs, wherein said multi-pattern evaluation plan is created by: (i) generating an initial evaluation plan, (ii) applying a search method to calculate modified versions of said initial evaluation plan, (iii) assigning a score to each of said modified versions based on a cost function, and (iv) selecting one of said modified versions having a highest said score as said optimal multi-pattern evaluation plan.

In some embodiments, the search is based, at least in part, on (i) reordering of said events in each of said CEPs to maximize common sub-patterns among said CEPs; and (ii) sharing of said common sub-patterns among all of said CEPs.

In some embodiments, the cost function minimizes a number of estimated intermediate results during an execution of said modified version.

In some embodiments, steps (ii) and (iii) are repeated iteratively based on one of: a specified time limit, and a specified number of iterations.

In some embodiments, the CEPs are based on user definition.

In some embodiments, the program instructions are further executable to execute, and the method further comprises executing, said multi-pattern evaluation plan on said data stream, to generate output data.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures Dimensions of components and features shown in the figures are generally chosen for convenience and clarity of presentation and are not necessarily shown to scale. The figures are listed below.

DETAILED DESCRIPTION

Disclosed herein are a system, method and computer program product for real-time multi-pattern complex event processing (Multi-pattern CEP or MCEP).

In some embodiments, the present disclosure provides for optimizing MCEP performance using a combination of sharing and pattern reordering techniques. In some embodiments, the present disclosure presents an optimization framework for solving this computationally hard problem under tight real-time conditions. In some embodiments, the present disclosure demonstrated in experimental evaluation a significant performance improvement as compared to known techniques.

In some embodiments, the present disclosure is based on formulating the MCEP task as a global optimization problem, and applying a combination of sharing and pattern reordering techniques to construct an optimal plan satisfying the problem constraints.

In some embodiments, the present disclosure provides for locating a best possible evaluation plan in a hyper-exponential solution space, using efficient local search algorithms that utilize the unique problem structure.

Complex event processing (CEP) methods are widely employed in applications where arbitrarily complex combinations (patterns) of data items must be promptly and efficiently detected in massive data streams. Examples of such areas include financial services, electronic health record systems, sensor networks, and Internet-of-Things (Iot) applications.

CEP systems treat data items as events arriving from event sources. As new events are detected, they are combined into higher-level complex events matching the user-specified patterns.

Modern CEP engines are typically required to support efficient simultaneous tracking of hundreds to thousands of patterns in multiple high-speed input streams of events. Systems possessing this functionality may be referred to an as multi-pattern complex event processing (MCEP) systems.

Figure 1A:
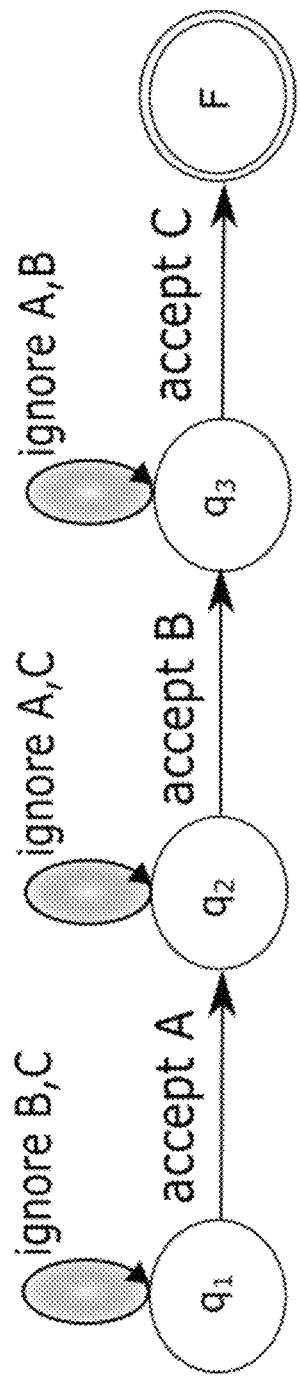
FIGS. 1A-1B show evaluation mechanisms for a sequence of events using NFA with and without reordering.
Figure 1B:
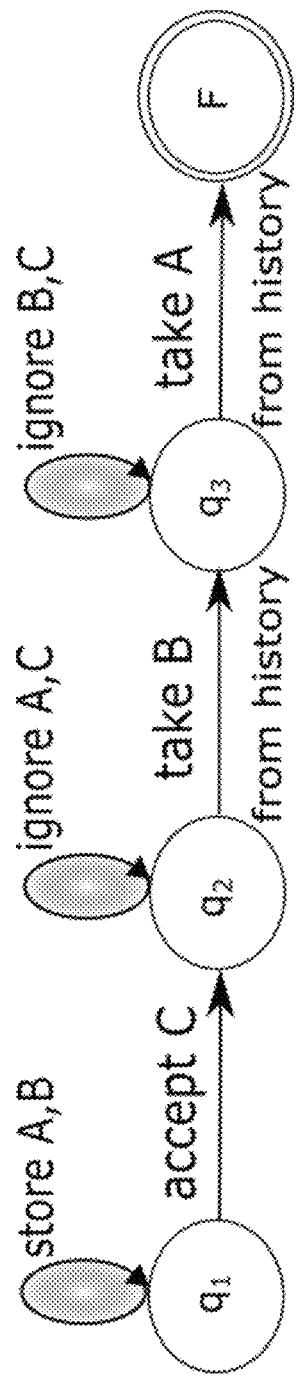

With reference to FIGS. 1A-1B, consider the following scenario: A system for managing an array of smart security cameras A, B, C is installed in a building. All cameras are equipped with face recognition software, and periodical readings from each camera are sent in real time to the main server. A detection objective is a scenario in which an intruder accesses the restricted area via the main gate of the building rather than from the dedicated entrance. This pattern can be represented as a sequence of three primitive events:

camera A (installed near the main gate) detects a person;
later, camera B (located inside the building's lobby) detects the same person;
finally, camera C detects the same person in the restricted area.

The system is concerned with detecting a scenario in which an intruder is detected near doorway A, then immediately passes through entrance B, and finally enters doorway C. This pattern can be formulated as a sequence of three events, each corresponding to getting a signal from sensors A, B, and C. A real-life MCEP system could define multiple 'abnormal' paths inside the building and specify a dedicated pattern for each path.

Pattern matches in known CEP systems are detected using an evaluation mechanism. One of the most prominent evaluation mechanisms is the non-deterministic finite automaton (NFA). FIGS. 1A-1B present an example of an NFA for detecting the sequence A→B→C of sensor signals. A state is defined for each prefix of a valid match. Every 'accepting' transition between states is associated with some event type. The detection is triggered by the arrival of a signal from sensor A. For each accepted signal, the stream of events from sensor B is probed. If a new signal is subsequently received from B, a corresponding event from sensor C is then checked.

During evaluation, an NFA keeps track of partial matches, that is, already detected subsets of a potential pattern match. A newly arrived event is combined with all currently stored partial matches corresponding to the state accepting this event. For instance, an event of type C will be matched with pairs of As and Bs. Accordingly, the known MCEP architecture leads to the worst-case exponential (in terms of pattern size) processing time and memory consumption.

Thus, it would be advantageous to maximize pattern detection performance in MCEP systems.

Attempts to make MCEP more efficient have targeted various possibilities for creating efficient evaluation mechanisms. Two of the most popular optimization strategies are pattern rewriting and pattern sharing.

Pattern rewriting methods exploit the statistical properties of the event data to replace the evaluation mechanism with an equivalent yet more efficient one. Pattern reordering is a more specific technique within this category, focused on modifying the order in which the events are processed. For example, if sensor C generates significantly fewer signals than A and B do, then instead of following the order A→B→C specified by the pattern, it would be beneficial to first wait for a signal from C, then examine the local history for previous signals received from sensors B and A. This way, fewer partial matches would be created, resulting in better memory utilization and faster processing of incoming events. FIG. 1B depicts an NFA constructed according to this improved plan.

Figure 2A:
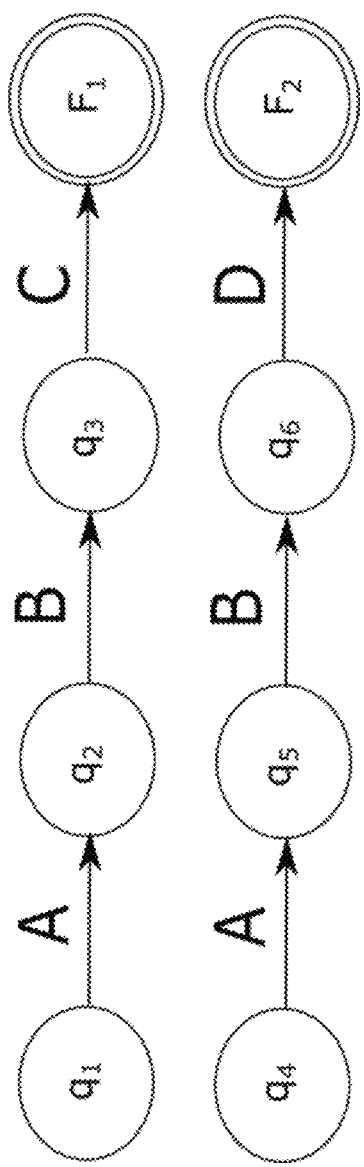
FIGS. 2A-2B show NFA sharing example for event sequences.
Figure 2B:
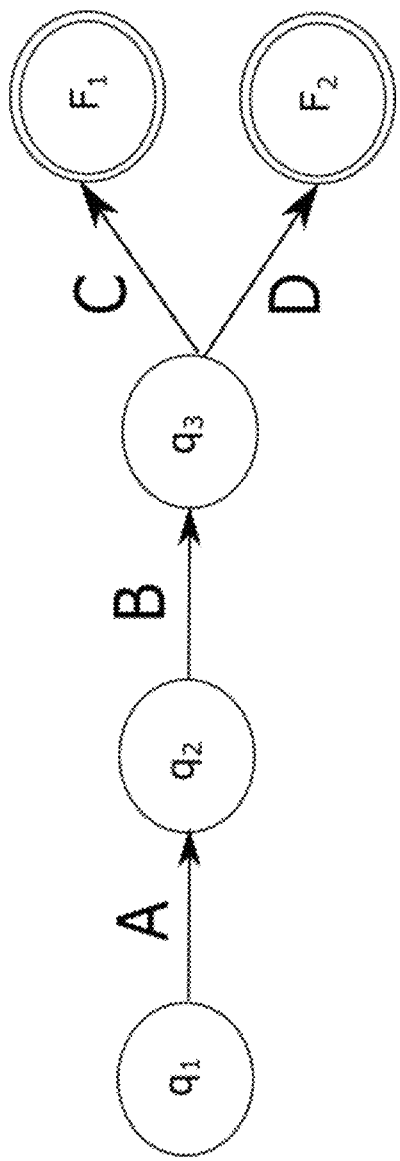

Pattern sharing methods utilize the structural similarities between different patterns to unify the processing of common subexpressions. FIGS. 2A-2B illustrate this principle. For presentational purposes, 'ignore' edges and 'accept' labels are omitted. The system monitors a pair of patterns $P_1$: A→B→C and $P_2$: A→B→D. Instead of processing these patterns independently (as in FIG. 1C), the system can merge the first three states of the respective NFAs to produce a joint automaton FIG. 1D). This optimization avoids duplicate instantiating and storing of partial matches.

Pattern reordering and pattern sharing are generally considered as orthogonal techniques and cover different aspects of CEP performance optimization. This also implies that each of the two methods overlooks certain opportunities exploited by the other.

Figure 3A:
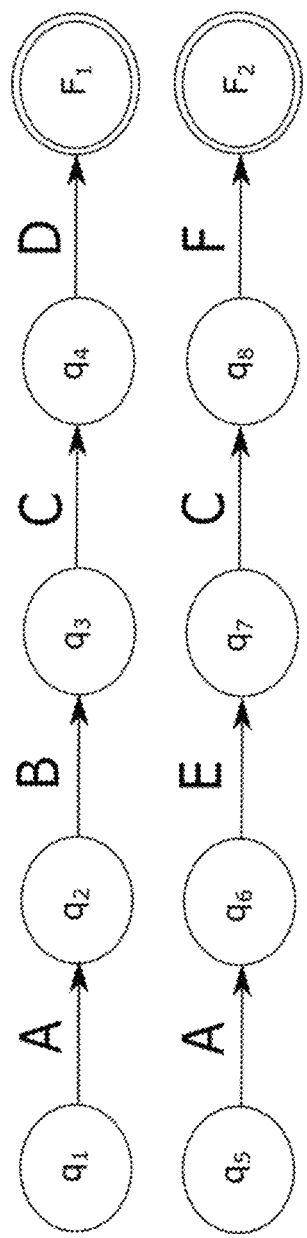
FIGS. 3A-3D show NFA optimization example for event sequences with no sharing or reordering, with reordering and without sharing, and with sharing and without reordering.
Figure 3B:
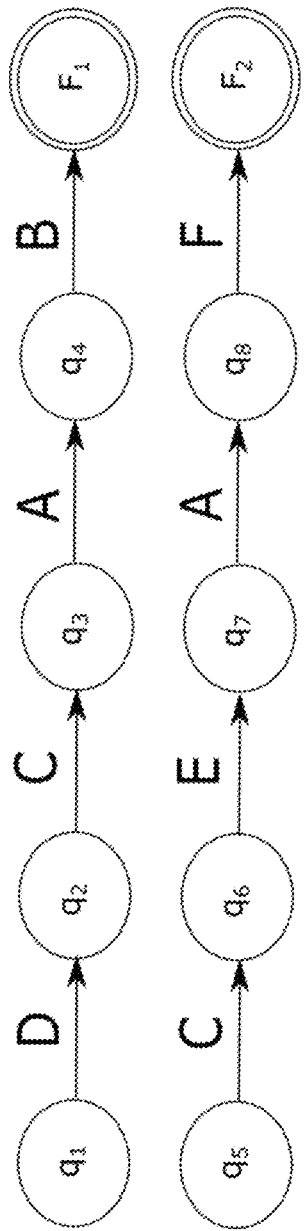
Figure 3C:
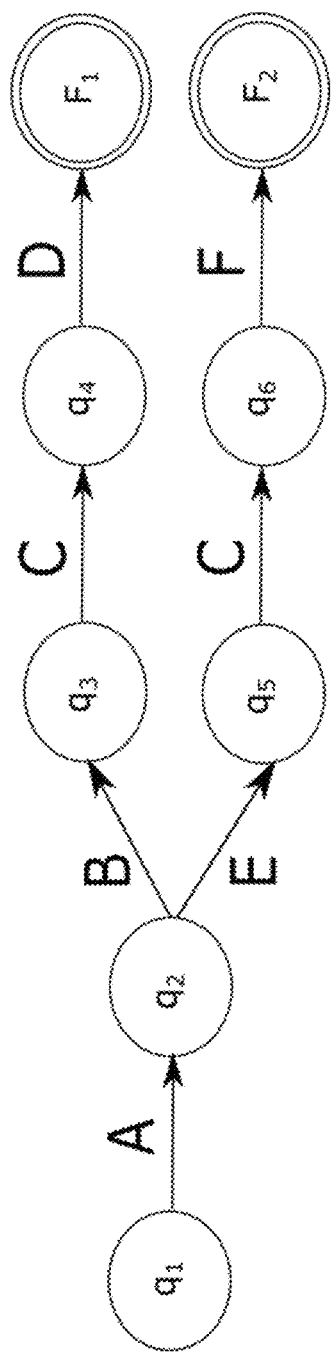

Accordingly, a fusion of both approaches could discover evaluation plans that would not be considered otherwise. This may be illustrated with reference to FIG. 3A-3D, illustrating the following arrangements:

FIG. 3A: NFA optimization with no sharing or reordering;
FIG. 3B: NFA optimization with reordering and no sharing;
FIG. 3C: NFA optimization with sharing and no reordering; and
FIG. 3D: NFA optimization with both sharing and reordering.

Figure 3D:
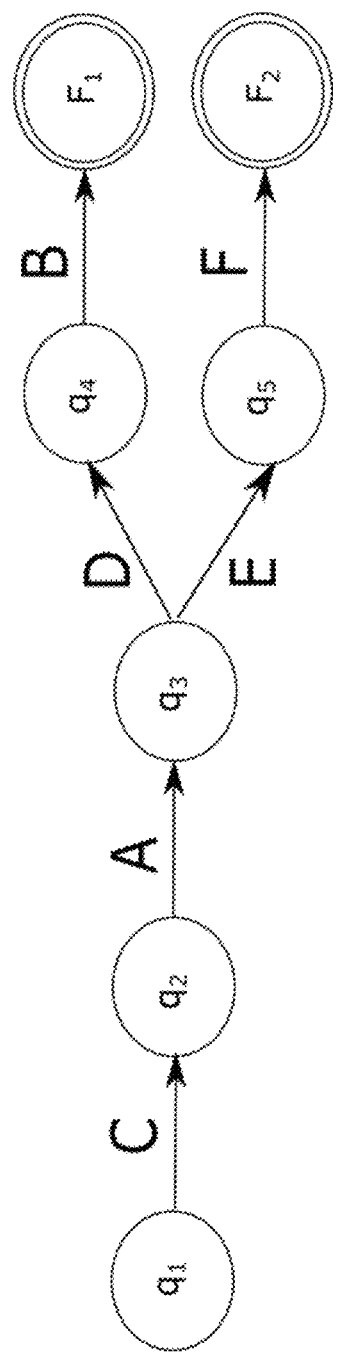

Reordering the patterns in FIG. 3A by the ascending order of event arrival rates might result in a pair of locally optimal NFAs (FIG. 3B). Alternatively, a global shared plan shown in FIG. 3C can be obtained by sharing the first two states. Now consider a combined application of the above techniques, where the NFAs are first reordered to maximize the common prefix length, and then this newly created subpattern is shared. FIG. 3D shows the resulting plan. This plan would never be created if only one of the two optimizations was employed, or if they were used independently.

Accordingly, in some embodiments, the present disclosure provides for a novel framework for large-scale MCEP. Rather than merely maximize the sharing degree or creating locally optimal plans, the present disclosure provides for a globally optimal plan for the given workload of patterns, using a combination of both sharing and reordering. In some embodiments, the present disclosure provides for an MCEP optimizer that uses sharing and reordering techniques to generate candidate evaluation plans. This fusion permits taking advantage of sub-expressions not normally considered for sharing. To traverse the hyper-exponential space of plans, the present disclosure further incorporates a method based on the local search paradigm. As opposed to known MCEP optimizers, the present disclosure can operate under arbitrarily tight time constraints due to the inherent balance between optimization time and solution quality.

A potential advantage of the present disclosure is, therefore in that it provides for a novel approach for optimizing large-scale MCEP systems by combining the power of state-of-the-art pattern sharing and reordering techniques. In some embodiments, the present disclosure also provides for a set of algorithms for efficiently searching the solution space. The present algorithms are highly precise and their execution time can be arbitrarily limited. In some embodiments, an MCEP engine may be then implemented utilizing the plans created by the present optimizer for efficient pattern detection.

Background and Terminology

Formally, an MCEP system accepts three parameters: an input data stream I, a pattern workload WL, and a statistics collection Stat. The input stream I={$e_1, e_2, \ldots$} is an ordered, possibly infinite temporal sequence of primitive events, or simply events. I is defined as a "logical" input source, possibly encapsulating multiple merged substreams. Each event $e_i$ is represented by a well-defined type and a set of attributes, including the occurrence timestamp. In the example from FIGS. 1A-1B, the event type is specified by the origin sensor ID, and the attribute set may include the movement speed of an intruder or the direction of passing.

The workload WL={$P_1, \ldots, P_n$} contains a finite number of patterns the system is requested to detect. Each pattern is defined by the tuple $P_i=(\mathcal{E}_i, S_i, C_i, W_i)$, where $\mathcal{E}_i=\{E_1, \ldots, E_{m_i}\}$ is the set of event types participating in $P_i$, $S_i$ denotes the structure of $P_i$ (which will be defined shortly), $C_i$ is the condition set specifying the constraints on the attribute values of the events, and $W_i$ is the time window defined for this pattern, that is, the maximal allowed time difference between the timestamps of a pair of events in a match.

The structure $S_i$ specifies how the events requested by the pattern are to be assembled to form a match. It is defined by a combination of event types and operators. In this disclosure, the most common operators such as AND, SEQ, and OR will be considered. The AND operator requires the occurrence of all events specified in the pattern. The SEQ operator also expects the events to appear in a predefined temporal order. The OR operator corresponds to the appearance of any event out of those specified. Two additional important operators are the negation (NOT), requiring the absence of an event from some position in the match, and the Kleene closure (KL), accepting one or more instances of an event.

To illustrate the above, the structure of the pattern from FIGS. 1A-1B could be summarized as SEQ(A,B,C), with $\mathcal{E}=\{A, B, C\}$. If the order of receiving the signals was not important, the pattern would be formulated as AND (A, B, C). In addition, assume that a signal arriving from the sensor D indicates the arrival of a security guard to the area, in which case no alarm should be set. Then, the structure of the pattern would become SEQ (AND (A, B, C), NOT(D)).

In the general case, $S_i$ is an arbitrary expression over the above operators. Such patterns can be simplified by the transition to DNF form. From the standpoint of an MCEP system, every clause of the resulting DNF expression can be considered as a separate pattern in a workload. In addition, a clause containing multiple AND/SEQ operators can be flattened to a simple expression featuring a single AND or SEQ with possible NEG and KL applied on single events. Therefore, only patterns of this simplified form will be considered herein.

Stat is a set of statistical data properties that are used by the MCEP engine during evaluation plan generation. In the example above, Stat contains the arrival rates of all event types (that is, of signals from each sensor). In addition, the selectivities of the conditions defined by the patterns will be considered as members in Stat. The selectivity of a condition is defined as the probability of the input tuple to successfully pass the condition. More formally, $$\text{Stat} = \{r_x \mid \exists P_i \in WL : E_x \in \mathcal{E}_i\} \cup$$
$$\{sel_{x,y}^{C_i} \mid \exists P_i \in WL : E_x, E_y \in \mathcal{E}_i\},$$

where $r_x$ is the arrival rate of the event type $E_x$, and $sel_{x,y}^C \in [0,1]$ is the selectivity of a mutual condition between $E_x$ and $E_y$ in some condition set C (where it is set $sel_{x,y}^C=1$ if no condition is defined between the event types). The results can be trivially extended to additional parameters, such as inter-event dependencies and costs of predicate evaluation, by modifying the cost model (see below).

Figure 4:
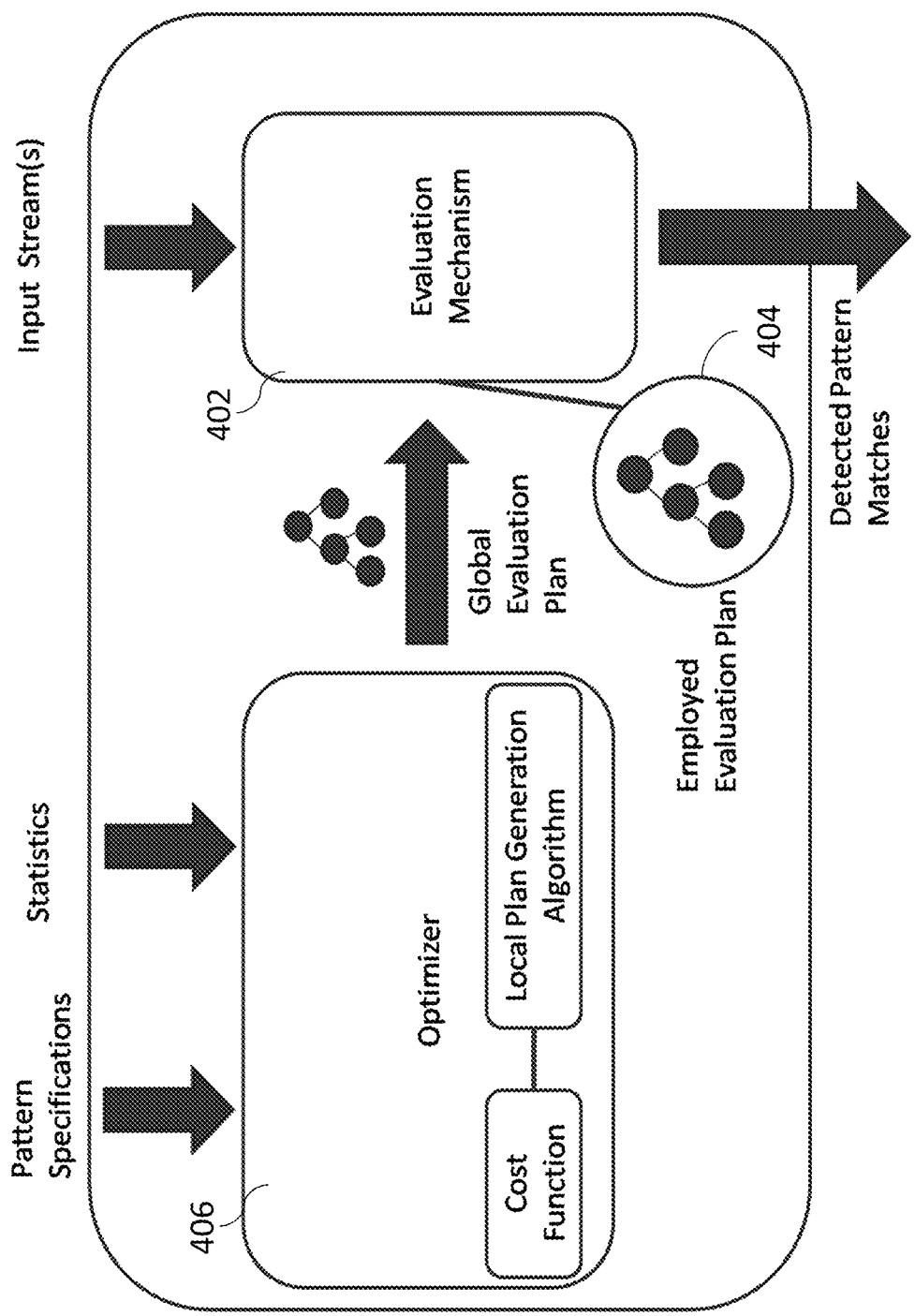
FIG. 4 is schematic structure of an exemplary MCEP systems, in accordance with some embodiments of the present invention.

FIG. 4 schematically illustrates an exemplary architecture of an MCEP system, according to an embodiment. The evaluation mechanism 402 is responsible for the actual processing of the input stream I. An evaluation mechanism of choice in FIGS. 1-3 is an NFA. Various works describe different variations of NFAs. In this disclosure, the 'lazy NFA' variety will be used exclusively (see, e.g., I. Kolchinsky, I. Sharfman, and A. Schuster. Lazy evaluation methods for detecting complex events. In DEBS, pages 34-45. ACM, 2015.)

A lazy NFA (FIG. 1B) can be configured to follow any execution order regardless of the actual order requested by the pattern. Since NFAs generally are only capable of tracking a single pattern, an extension for multiple patterns will be presented in below.

At runtime, the evaluation mechanism follows an evaluation plan 404 supplied by the optimizer 406. A distinction is drawn between local evaluation plans applicable for single-pattern evaluation mechanisms only, and global evaluation plans that consider a workload of patterns. For example, the plans applied by the NFAs in FIGS. 1A-1B are local evaluation plans, whereas FIGS. 2 and 3 illustrate global evaluation plans.

Different evaluation mechanisms support different types of evaluation plans. Creating a lazy chain-structured NFA (FIG. 1) for a single pattern requires an order-based local evaluation plan. For a pattern P over the event types $E_1, \ldots, E_m$, the order-based evaluation plan is an ordering $O=(E_{q_1}, \ldots, E_{q_m})$, where $q_1, \ldots, q_m$ is a permutation of $[1, \ldots, m]$. Any pattern using the operators defined above (with the exception of OR) can be detected by such NFA.

The task of the optimizer 406 is to create a global evaluation plan upon system initialization. The resulting plan is then transferred to the evaluation mechanism 402, which subsequently launches the detection process on a stream I. The optimizer 406 typically uses a predefined cost function to measure the quality of a plan subject to the given workload WL and the statistics collection Stat. This function is defined as Cost: $\mathfrak{P} \times \mathbb{W} \times STAT \to \mathbb{R}$, where $\mathfrak{P}$, $\mathbb{W}$, STAT are the sets of all global evaluation plans, workloads, and statistics collections, respectively. The cost assigned by this function may reflect performance metrics such as throughput, detection latency, communication cost, and more.

The present analysis below assumes the values in Stat to be constant and known in advance. However, in real-life scenarios this information is rarely obtained in advance and is subject to rapid fluctuations over time. To overcome this problem, the present disclosure employs standard adaptivity mechanisms, continuously estimating the up-to-date statistics and relaunching the optimizer when a significant change is detected.

Multi-Pattern CEP with Prefix Sharing

This section presents the core principles and algorithms behind the present MCEP system. For presentational purposes, a limited version of the present method is described, only considering prefix sharing opportunities between patterns. This description is further extended below to support arbitrary sub-expression sharing.

Multi-Pattern NFA Evaluation

In some embodiments, the present disclosure processes all patterns in a workload using a single NFA, which is denoted as the multi pattern NFA. It is organized in a tree-like topology formed by merging the common prefixes of the chain-structured NFAs corresponding to each pattern in the workload. The root of the tree is shared between all patterns and serves as the initial state of the automaton. Each internal node can be shared between two or more patterns.

Because different patterns may have different time windows, each state of the multi-pattern NFA is augmented with a special time window attribute, set to the largest time window among the patterns sharing the state. The system uses this attribute to decide whether a partial match has expired.

Figure 5C:
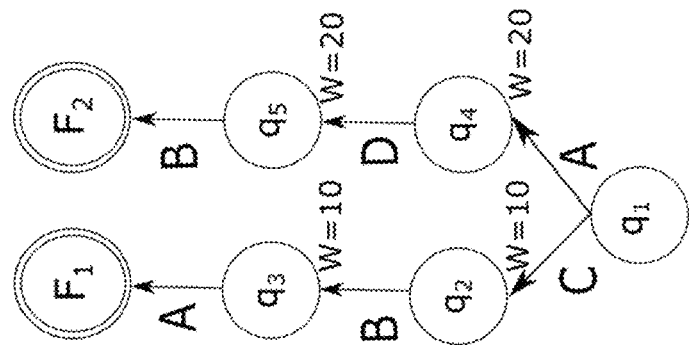
FIGS. 5A-5C show multi-pattern trees for a workload consisting using different evaluation orders.
Figure 5B:
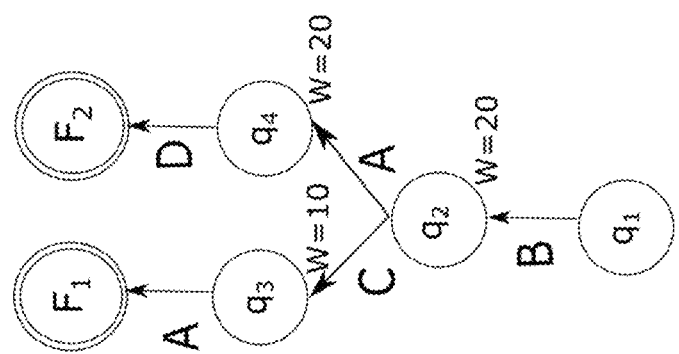
Figure 5A:
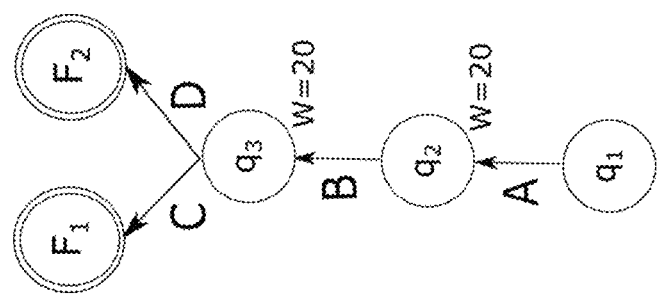

FIGS. 5A-5C depict three of the possible multi-pattern NFAs for a workload of two patterns, $P_1$: SEQ(A, B, C) and $P_2$: SEQ(A, B, D), with $W_1=10$ and $W_2=20$, where FIG. 5A depicts evaluation orders A,B,C and A,B,D (maximal sharing); FIG. 5B depicts evaluation orders B,C,A and B,A,D; and FIG. 5C depicts evaluation orders C,B,A and A,D,B (minimal sharing). As discussed above, some NFAs have more shared states, while others contain more states in total but provide more efficient evaluation paths for individual patterns.

For each pattern in a workload, a dedicated final state is defined. When the final state corresponding to some pattern is reached, a match is reported. Note that while final states are typically the leaves of the tree, this is not always the case. For example, in a workload consisting of SEQ(A, B, C) and SEQ(A, B), the final state for SEQ(A, B) is an internal node.

The evaluation process for multiple patterns is similar to the one presented in (Kolchinsky [2015]) for single-pattern detection. As a new event e of type T enters the system, it is evaluated against existing NFA instances. An instance is defined by a combination of a unique state identifier and a partial match. The system starts with a single instance associated with the initial state and an empty match. All instances associated with states containing an outgoing transition for T are matched with e. For every instance satisfying the conditions between the events (including e), a new instance is created containing the new match resulting from e's addition and associated with the state to which the transition leads. When an instance corresponding to some final state is created, its match is reported to the end users. An instance exceeding the time window specified by its associated state is removed from the system.

Because the number of instances in a system processing a large workload may be huge, traversing all of them on every event arrival is impractical. Instead, for each event type T, a list $l_T$ is defined to contain all states with an outgoing transition accepting T. The size of $l_T$ can never exceed the number of patterns in a workload containing T in their specification and will be substantially lower under an efficient sharing strategy that aims to merge states that process interleaving event types. At runtime, NFA instances are stored in a hash table according to their associated state, and the arrival of an event of type T only triggers the traversal of instances associated with states in $l_T$. For example, the state lists of a multi-pattern NFA in FIG. 5B are $l_A=\{q_2, q_3\}$, $l_B=\{q_1\}$, $l_C=\{q_2\}$, $l_D=\{q_4\}$.

Multi-Pattern Tree

Global evaluation plans utilized by multi-pattern NFAs are similarly structured in a tree-like manner. This plan type may be referred to as the multi pattern tree (MPT). Given an MPT, a multi-tree NFA is constructed by simply copying the structure of the former.

As described above, an MPT is created by the optimizer. In some embodiments, the present disclosure provides or an optimizer which proceeds by creating an initial MPT and repeatedly modifying it. Hence, efficient creation and modification operations are crucial for minimizing the optimization cost. In implementing these operations, the core principle of MPT behavior is to unconditionally share all shareable prefixes of the supplied local evaluation plans (orders). To add an evaluation order O to an existing MPT, iterations are performed over O and only create a new node if no equivalent one exists. Two nodes are considered equivalent if and only if they correspond to identical sequences of event types, and if their edges specify identical conditions. Similarly, a plan is removed by iterating over the respective order and only deleting states that are not shared with other patterns.

Figure 6C:
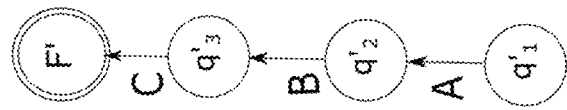
FIGS. 6A-6C show MPT modification examples following the addition or removal of a local evaluation plan, in accordance with some embodiments of the present invention.
Figure 6C:
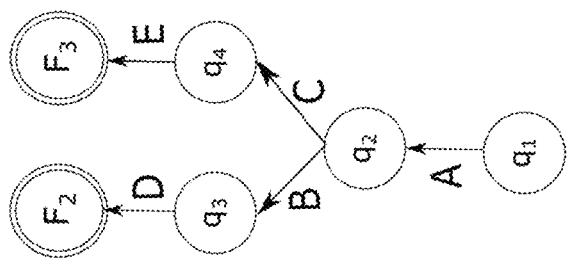
Figure 6B:
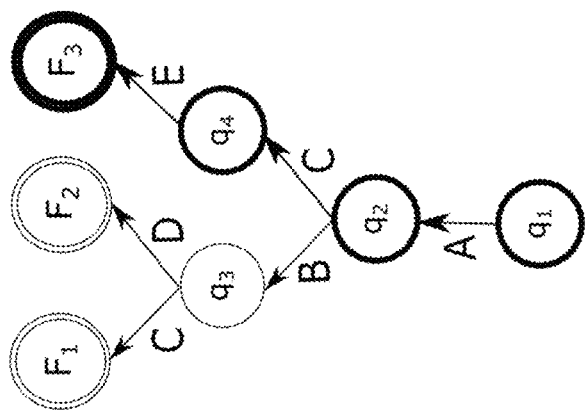
Figure 6A:
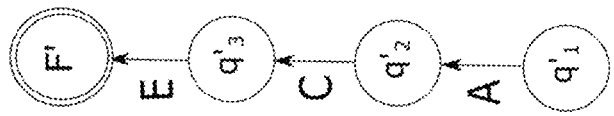
Figure 6A:
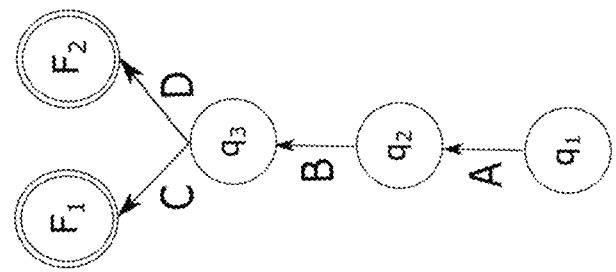

FIGS. 6A-6C illustrate MPT modification examples, e.g., addition and removal of a plan from an MPT. The complexity of both operations is O(m), where m is the length of the evaluation order. FIG. 6A depicts an MPT from FIG. 5A and a local plan for a pattern SEQ(A,C,E); FIG. 6B depicts the MPT following the addition of the new evaluation plan (the path corresponding to the newly added plan is highlighted); and FIG. 6C depicts the MPT after the local evaluation plan for SEQ(A,B,C) is removed.

Creating an MPT from a set of orders $\{O_1, \ldots, O_n\}$ is implemented by iteratively adding the orders to an initially empty tree. This operation requires $O(n \cdot max(m_i))$ time and space, where $m_1$ is the length of $O_i$.

Since MPTs merge all common prefixes, an MPT can be uniquely defined by the tuple $(O_1, \ldots, O_n)$. Forcing some nodes not to be shared is only possible by modifying the individual evaluation orders. This way, careful selection of local evaluation plans by the optimizer can achieve the perfect balance between sharing degree and local evaluation plan quality.

Runtime Complexity and Multi-Pattern Cost Model

This section analyzes the runtime complexity of the MCEP evaluation process described above, and derives the cost function definition for multi-pattern trees.

The total cost associated with processing a single event e of type T is the sum of two components: 1) the cost of combining e with the existing partial matches and creating new instances as a result of successful matching; 2) the cost of purging the instances created as a result of e's arrival upon their expiration. The former will be denoted as CP(T) and the latter as CR(T).

Both functions depend on the expected number of instances active at the time of an event arrival. Reducing the number of instances (or, more generally, the size of intermediate results) is a common optimization goal in multiple fields, including database query optimization and complex event processing. For an order-based plan $O=(E_{q_1}, \ldots, E_{q_m})$ detecting a pattern $P=(\mathcal{E}, S, C, W)$, this cost function is defined as:

$$\text{Cost}_{ord}(O, P, \text{Stat}) = \sum_{k=1}^{|\mathcal{E}|} \text{Cost}_{ord}^k(O, P, \text{Stat}),$$

where $\text{Cost}_{ord}^k$ is the cost of the $k^{th}$ state in the chain-based NFA following O, calculated as follows:

$$\text{Cost}_{ord}^k(O, P, \text{Stat}) = W^k \cdot \prod_{i=1}^{k} r_{q_i} \cdot \prod_{i,j \leq k; i \leq j} sel_{q_i,q_j}^C,$$

where $r_i$; $i \in [1, m]$ and $sel_{i,j}^C$; $i,j \in [1, n]$ are as defined above.

In some embodiments, the above definition may be used to calculate the expected number of instances existing simultaneously at any given moment during MPT-based multi-pattern evaluation. Given a node N, let $\mathcal{P}_N$ denote the path from the root of the MPT to N (by definition of a tree, there is always exactly one such path). For the root, there is set $\mathcal{P}_R = \emptyset$. The total number of instances is the sum of numbers of instances associated with each NFA state (and hence with the corresponding MPT node), calculated as follows:

$$\#inst(MPT, WL, \text{Stat}) = \sum_{N \in MPT} \text{Cost}_{ord}^{|\mathcal{P}_N|}(\mathcal{P}_N, WL, \text{Stat}).$$

Thus, to calculate the number of instances to be traversed upon arrival of an event of type T, it is needed to sum the instances associated with the states in $l_T$:

$$\#inst_T(MPT, WL, \text{Stat}) = \sum_{S \in l_T} \text{Cost}_{ord}^{|\mathcal{P}_{N(S)}|}(\mathcal{P}_{N(S)}, WL, \text{Stat}),$$

where N(S) denotes a node corresponding to S in MPT.

The processing cost per event is now derived as follows. Let $C_a$ be the cost of accessing an instance, $C_n$ the cost of creating a new instance and inserting it into the data structure, and $C_r$ the cost of removing an instance from the system. In addition, let $C_v(T, \mathcal{P}_N)$ denote the cost of verifying the conditions between a new event of type T and the events preceding T in $\mathcal{P}_N$, and let $Sel_v(T, \mathcal{P}_N)$ denote the total selectivity of the above conditions. To make and $C_v$ and $Sel_v$ well-defined, there is set $C_v = Sel_v = 0$ if $T \notin \mathcal{P}_N$. Then, the expected cost of processing a single event of type T is:

$$CP(T) = \sum_{S \in l_T} \Big( \text{Cost}_{ord}^{|\mathcal{P}_N|}(\mathcal{P}_{N(S)}, WL, \text{Stat}) \cdot$$

$$(C_a + C_v(T, \mathcal{P}_{N(S)}) + Sel_v(T, \mathcal{P}_{N(S)}) \cdot C_n) \Big).$$

To calculate the cost of removing the expired instances, it is observed that the expected number of instances created in state S after processing a new event of type T is equal to $Sel_v(T, \mathcal{P}_{N(S)})$. Thus, the cost of eventually removing these instances upon their expiration is:

$$CR(T) = \sum_{S \in l_T} \text{Cost}_{ord}^{|\mathcal{P}_{N(S)}|}(\mathcal{P}_{N(S)}, WL, \text{Stat}) \cdot Sel_v(T, \mathcal{P}_{N(S)}) \cdot C_r.$$

The above analysis emphasizes two main performance objectives of an MCEP system attempting to minimize the processing cost per event. First, the sharing degree needs to be maximized to reduce the sizes of the state lists $l_T$. Second, the cost of the local evaluation plans in terms of the expected number of simultaneously existing instances has to be as low as possible. As illustrated in FIG. 3, there might be a conflict between these two objectives, which will be solved by defining an optimization problem later on.

The extended formula for the expected number of instances represents the same parameter dependencies as does the expression CP(T)+CR(T). Hence, it will be used as a cost function for measuring the quality of MPTs:

$$\mathrm{Cost}_{ord}^{multi}(MPT, WL, \mathrm{Stat}) = \#inst(MPT, WL, \mathrm{Stat}).$$

MCEP Optimization Problem

In some embodiments, the problem to be solved by an MCEP optimizer may be formally defined as follows: Given an order-based plan O for a pattern P and a multi-pattern tree MPT, O∈MPT if and only if MPT contains a path $\mathcal{P}$ of length |O|, starting at the root and ending at some final state, such that the event types and the conditions specified on the transitions in $\mathcal{P}$ are identical to those of a NFA detecting P according to O. For example, an MPT in FIG. 6B satisfies $O_3=(A, C, E)\in MPT$. $ORD_P$ denotes the set of all valid order-based evaluation plans for P. For a pattern of size m, $|ORD_P|=m!$ Accordingly, a tree-based MCEP optimization problem (T-MCEP) may be defined as follows: Given a workload WL of n patterns and a statistics collection Stat, find a multi-pattern tree MPT minimizing the value of the cost function $\mathrm{Cost}_{ord}^{multi}$ (MPT, WL, Stat) subject to $$\forall P_i, 1 \leq i \leq n : \exists O \in ORD_P \text{ s.t. } O \in MPT.$$

The path in the MPT corresponding to the evaluation order of a pattern is denoted as $P_i$ as $\mathcal{P}_i$.

The complexity of T-MCEP may be described as follows: It can be noted that for n=1, the present problem is equivalent to the single-pattern CEP optimization problem (SCEP), thoroughly discussed in previous work. In particular, it was shown in, e.g., I. Kolchinsky and A. Schuster, "Join query optimization techniques for complex event processing applications." PVLDB, 11(11):1332-1345, 2018, that SCEP is NP-complete by reducing it to the problem of join evaluation order generation. The NP-completeness of this latter problem was in turn proven through a reduction to the maximum clique problem. The maximum clique problem is not only known to be NP-complete, but is also hard to approximate. It was demonstrated in that, unless NP=ZPP, no polynomial-time algorithm exists that approximates the problem within the factor of $n^{1-\epsilon}$, where n is the size of the graph. By correctness of the reductions, this result applies also to the SCEP problem, and, by generalization, to T-MCEP.

Optimization Framework for T-MCEP

T-MCEP is a computationally hard optimization problem, characterized by an enormously large solution space and multiple local minima. Therefore, advanced techniques are needed in order to produce a high-quality solution under tight restrictions common for real-time MCEP systems.

The algorithms employed by the present optimizer to achieve this goal implement the local search paradigm. Local search is a well-known approach for finding approximate solutions for hard optimization problems, based on executing heuristically guided random walks in the solution space and searching for the cheapest solution subject to a predefined cost function. Local search methods are successfully applied for solving a wide range of problems, from the classic traveling salesman problem to code design and VLSI layout synthesis.

Local search methods present several important benefits for real-time streaming applications, and in particular for MCEP. Most importantly, they offer a tradeoff between the quality of the returned solution and the running time of the search. Since the local search procedure keeps a "current best" solution at any point of its execution, it can always be interrupted due to expired time limit and will return a valid solution, albeit not necessarily the cheapest. This property makes local search methods an attractive choice for targeting the MCEP optimization problem under tight real-time constraints.

Multi-Pattern Graph

Let $\pi_\chi(Y)$ denote a projection of an expression Y on a set of variables $\chi$. Y can be either a pattern structure or a condition set as defined above, for example, $\pi_{(B, D)}(\mathrm{SEQ}(A, B, C, D))=\mathrm{SEQ}(B, D)$. Given a pattern $P=(\mathcal{E}, S, C, W)$, another pattern $P'=(\mathcal{E}', S', C', W')$ is a subpattern of P (marked as $P'\subseteq P$) if $\mathcal{E}'\subseteq \mathcal{E}$, $S'=\pi_{\mathcal{E}'}(S)$, $C'=\pi_{\mathcal{E}'}(C)$, and $W'\leq W$.

A common subpattern $P_{ij}=(\mathcal{E}_{ij}, S_{ij}, C_{ij}, W_{ij})$ of two patterns $P_i, P_j$ is a pattern satisfying $(P_{ij}\subseteq P_i)\wedge(P_{ij}\subseteq P_j)$, such that $W_{ij}=\min(W_i, W_j)$. A maximal common subpattern of $P_i, P_j$ is a common subpattern $P_{ij}$, such that no other common subpattern $P'_{ij}$ satisfies $P_{ij}\subseteq P'_{ij}$. Thus may be denoted by $MP_{ij}$ herein. In addition, the set of all subsets of $MP_{ij}$ is denoted by $\Gamma_{ij}$, that is, all common subpatterns of $P_i$ and $P_j$. Obviously, $\Gamma_{ij}=\Gamma_{ji}$ for each i, j. The above definitions are trivially extended to an arbitrary number of intersecting patterns.

To illustrate the above notations, let $P_1$:SEQ(A,B,C,D) and $P_2$:SEQ(A,E,C,D). Assume that both patterns have no conditions and $W_1=10$, $W_2=20$. Then, SEQ(A, D), SEQ(C, D), and SEQ(A, C) with W=10 are common subpatterns of $P_1$ and $P_2$, while SEQ(C, A) is a subpattern of neither, since it has a conflicting structure. The maximal common subpattern is SEQ(A, C, D).

The multi pattern graph MPG=(V, E) is a data structure capable of efficiently collecting, maintaining, and retrieving the information regarding the mutual subpatterns of $P_1, \ldots, P_n$. For each pattern $P_i$, MPG contains a vertex $v_i\in V$. For each pair of distinct patterns $P_i, P_j$ with non-empty intersection (i.e., satisfying $\Gamma_{ij}\neq\emptyset$), an undirected edge $e_{ij}=(v_i, v_j, \Gamma_{ij})\in E$ is defined.

Figure 7:
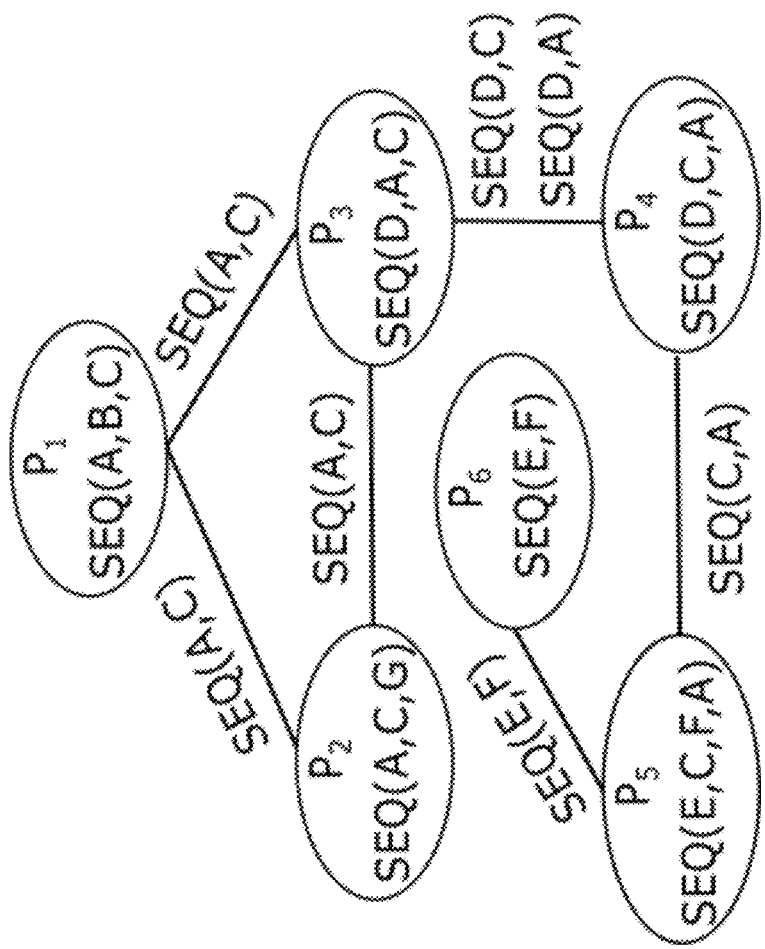
FIG. 7 shows a multi-pattern graph for a workload of 6 patterns, in accordance with some embodiments of the present invention.

FIG. 7 depicts an MPG for a workload of 6 patterns. For presentation clarity, edges with maximal common subpattern of size 1 are not shown. The triplet $P_1, P_2$ and $P_3$ share a maximal common pattern SEQ(A, C). $P_3$ and $P_4$ have two distinct maximal common sub-patterns. $P_6$ is fully contained in $P_5$.

In the general case, an MPG is an arbitrary, not necessarily connected graph. However, it can be noted that any algorithm solving T-MCEP can be activated separately on each connected component, and the results can then be combined to produce the final plan. Not only does this observation allow to solve the problem much more efficiently in the presence of multiple components, but it also makes it possible to limit the discussion below to connected graphs.

To guarantee an efficient local search procedure, the MPG has to occupy small space. Moreover, addition and removal operations must be fast and low-cost, and likewise for the retrieval of pattern intersection information. By utilizing compact graph representation and advanced optimizations, it is possible to guarantee near constant cost of retrieval and worst-case linear cost of addition and deletion with near linear space complexity.

Local Search Algorithms for T-MCEP

A local search problem is specified by a pair ($\varphi$, f), where $\varphi$ is a set of feasible problem solutions and f: $\varphi \to \mathbb{R}$ is a cost function. The goal is then to find an optimal solution s* such that f(s*)≤f(s) for all s∈$\varphi$. In the case of T-MCEP, $\varphi$ consists of all possible MPTs and f=$\text{Cost}_{ord}^{multi}$.

The search starts from some initial solution $s_{init}$. Local search algorithms traverse the search space by exploring the neighborhood of the current solution. A domain-specific neighborhood function $\mathcal{N}$: $\varphi \to 2^\varphi$ maps a solution to a set of its neighbors, i.e., solutions that can be obtained by performing a slight modification. The strategy for performing the search is determined by the meta-heuristic in use. A local search algorithm for a given problem can be uniquely defined by a combination of a meta-heuristic and a neighborhood function. When a predefined stopping criterion is satisfied, the search terminates and the cheapest observed solution is returned.

The local search algorithms employed by the present optimizer for solving T-MCEP utilize two well-known meta-heuristics, simulated annealing and Tabu search. It can be noted that the solution space of the present problem is enormously large. For a workload of size n, there are $\Pi_{i=1}^{n} |P_i|!$ possible MPTs, where $|P_i|$ denotes the number of event types in the $i^{th}$ pattern. Fortunately, closer analysis of the solution space will allow to immediately discard the overwhelming majority of the subplan combinations.

The following can be observed regarding the possible local evaluation orders for a pattern $P_i$ in the shared workload. If no subset of $P_i$ can be shared with other patterns, it only makes sense to select the most efficient evaluation order. Otherwise, for every shareable sub-pattern P'⊆P, it is required to consider an order that starts with the best order O' for P', then continues with the best order for the remainder of the pattern given O' as the prefix. Note that not only the maximal common subpatterns but also their subsets must be considered, including the empty subset (which is equivalent to the case when no such P' exists).

The following theorem will formally state the above in t:

Theorem 1: Let $\text{MPT}_{opt}$ be the optimal multi pattern tree for some workload W. Then, for each path $\mathcal{P}_i$ in $\text{MPT}_{opt}$ corresponding to the pattern $P_i$ at least one of the following holds: (1) $\mathcal{P}_i$ is the optimal evaluation order for $P_i$; (2) $\mathcal{P}_i$ can be divided into a non-empty prefix Pre $f_i$ that is shared with at least one additional pattern and a non-shared suffix Suf $f_i$, and it is the most efficient local evaluation order for $P_i$ out of those starting with Pre $f_i$.

The proof is straightforward by assuming that neither (1) nor (2) hold and showing that $\text{MPT}_{opt}$ can be improved by modifying Suf $f_i$ to make $\mathcal{P}^i$ the most efficient order starting with Pre $f_i$, which contradicts the optimality of $\text{MPT}_{opt}$. Since Suf $f_i$ is not shared by definition, improving it necessarily leads to an improvement of $\text{MPT}_{opt}$.

Theorem 1 reduces the maximal number of potential orders for a single pattern from $|P_i|!$ to $\Sigma_{j=1}^{n}|\Gamma_{ij}|$. However, to apply the above strategy, an algorithm is required to calculate local evaluation plans as described above. The existence of a deterministic local plan generation algorithm $\mathcal{A}$ is assumed, capable of the following functionality:

Given a pattern P and the statistical event characteristics Stat, return the cheapest local order-based evaluation plan O subject to $\text{Cost}_{ord}$.

Given a pattern P, its subpattern P', an evaluation plan O' for P', and the statistics collection Stat, return the cheapest (subject to $\text{Cost}_{ord}$) local order-based evaluation plan O starting with prefix O'.

Many algorithms answering the above requirements have been proposed. In particular, any greedy algorithm or an algorithm based on dynamic programming satisfies both conditions. While most algorithms are not guaranteed to produce an optimal result due to the NP-hardness of local evaluation plan generation, they provide empirically accurate approximations.

With the above observation in mind, neighborhood functions for T-MCEP can be defined. The first function produces a neighboring solution by selecting a random edge ($v_i$, $v_j$) in the MPG and a common subpattern P∈$\Gamma_{ij}$. P is restricted to be different from the subpattern that is shared between $P_i$ and $P_j$ in the current MPT (however, its subpatterns are allowed). A neighbor will be generated by invoking $\mathcal{A}$ to create new evaluation orders $O_i$, $O_j$ sharing a common prefix $O_p$, and replacing $\mathcal{P}_i$, $\mathcal{P}_j$ with the resulting orders. This neighborhood will be denoted as an edge-based neighborhood and the notation $\mathcal{N}_{edge}$ will refer to it. $\mathcal{N}_{edge}$ (MPT) will denote the set of all solutions that can be obtained by the above procedure. The size of the neighborhood produced by $$\mathcal{N}_{edge} \text{ is } \frac{1}{2} \cdot \sum_{i=1}^{n} \sum_{j=1; j \neq i}^{n} |\Gamma_{ij}|.$$

The main drawback of $\mathcal{N}_{edge}$ is that it can only attempt pairwise sharing. In many real-life scenarios, a single subexpression might be shared between patterns comprising a large fraction of the workload. While sharing such subexpression between all involved patterns may dramatically increase the performance, only considering two of them may fail to produce an improvement over the plan not sharing the expression at all. As a result, the sharing opportunity may be missed.

To overcome this limitation, a vertex-based neighborhood $\mathcal{N}_{vertex}$ may be defined. Let $V_i = \cup_{(v_i, v_j) \in E} P_{ij}$ be called the vicinity of $v_i$. Instead of an edge, the neighborhood function will select a vertex $v_i$ and a subpattern P in the vicinity of $v_i$. Then, let $\Gamma_P$ denote a set of all patterns containing P. This set can be efficiently retrieved from the MPG as further described below. min(k, $|\Gamma_P|$) patterns are selected, where k≥2 is a predefined parameter. Then, $\mathcal{A}$ will be invoked to generate new evaluation orders sharing a common prefix $O_p$.

The variation of $\mathcal{N}_{vertex}$ will be denoted using a particular value for k as $\mathcal{N}_{vertex}^k$. Note that $\mathcal{N}_{vertex}^2$ is equivalent to $\mathcal{N}_{edge}$. The size of the neighborhood of $\mathcal{N}_{vertex}^k$ is bounded by $$\sum_{i=1}^{n} \sum_{P \in V_i} \binom{|\Gamma_P|}{k}.$$

The per-step complexity of the neighborhood functions $\mathcal{N}_{edge}$ and $\mathcal{N}_{vertex}^k$ is $O(\Sigma_{i=1}^{n} m_i \cdot \mathcal{O})$, where $\mathcal{O}$ is the complexity of $\mathcal{A}$. A step is defined as a single selection of a neighbor and evaluating its cost.

In all algorithms, the initial state is set to the MPT in which all patterns are evaluated according to the best possible local evaluation orders, that is, $\mathcal{P}_i = \mathcal{A}(P_i, \text{Stat})$ for all i.

MCEP with Arbitrary Subexpression Sharing

The multi-pattern plan generation method above only considers prefix sharing. This introduces a significant limitation, since the optimizer is required to move common subpatterns to the MPT root in order to share their computation. This mechanism also prevents a pattern from sharing multiple distinct subexpressions with other patterns. As an example, consider a workload consisting of patterns $P_1$: SEQ(A, B, C, D), $P_2$: SEQ(A,E,C,F), $P_3$: SEQ(G,B,H,D). In order to share the subpattern SEQ(A,C) with $P_2$, the evaluation order of $P_1$ must start with (A, C) or (C, A). On the other hand, it has to start with (B, D) or with (D, B) to share the subpattern SEQ(B, D) with $P_3$. The optimizer will have to refrain from sharing one of the subpatterns in this case.

Figure 8C:
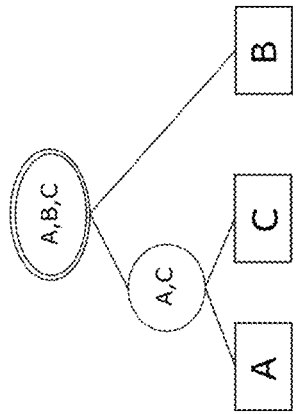
FIGS. 8A-8C show exemplary tree-based plans for a pattern, in accordance with some embodiments of the present invention.
Figure 8B:
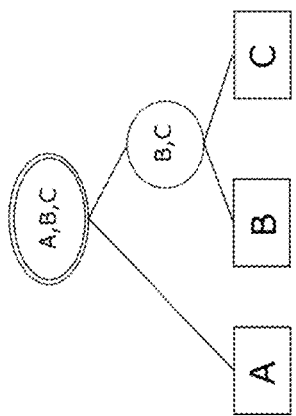
Figure 8A:
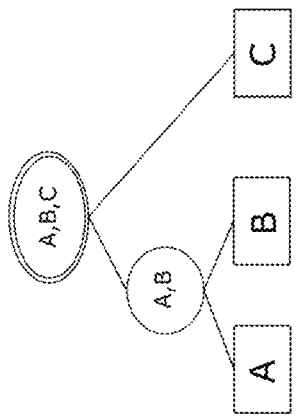

In some embodiments, the present optimization framework is extended to arbitrary subexpression sharing. To that end, the local order-based plans are replaced with tree-based plans, shaped as binary trees. Tree-based plans specify the structure for tree-based single-pattern evaluation mechanisms. A leaf is defined for each event type, and the root of the tree serves as a final state. The evaluation proceeds from the leaves towards the root, with each internal node responsible for a subpattern consisting of the event types in its subtree. FIG. 8 presents three possible tree-based plans for a pattern SEQ(A, B, C). Tree-based evaluation mechanisms were shown by multiple studies to be more expressive and perform better than NFAs.

The tree-based evaluation process is similar to the one described for NFAs. As a new event arrives, an instance is created containing this event. Every instance corresponds to some subtree s of the tree-based plan. A new instance I is combined with previously created "siblings", that is, instances associated with a node sharing the parent with the node of I. As a result, another instance containing the unified subtree is generated. This process continues iteratively until the root of the tree is reached or no siblings are found.

Figure 9:
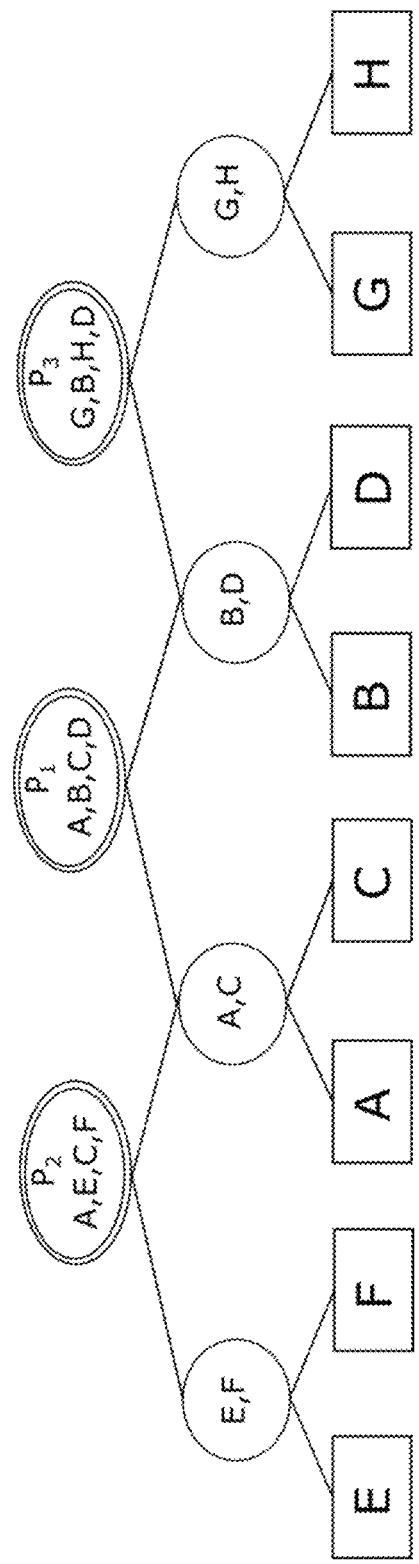
FIG. 9 shows a multi-pattern multitree for a shared workload of patterns, in accordance with some embodiments of the present invention.

Similarly to MPT, a multi pattern multitree (MPM) is defined as the global plan consisting of multiple shared tree-based plans. Each pattern in an MPM has a dedicated root, and all leaves corresponding to the same event type are shared regardless of the plan in use. FIG. 9 depicts a possible MPM for a shared workload of patterns $P_1$: SEQ(A, B, C, D), $P_2$: SEQ(A,E,C,F), and $P_3$: SEQ(G,B,H,D). Note that the displayed plan successfully shares both subpatterns of $P_1$ with $P_2$ and $P_3$, a result that could not be achieved using an order-based approach.

The multitree-based MCEP optimization problem (M-MCEP) will be defined similarly to T-MCEP. The formal definitions of M-MCEP, the new cost functions $\text{Cost}_{tree}$ and $\text{Cost}_{tree}^{multi}$, and the corresponding extension of Theorem 1 can be found further below.

The MPM is created and modified similarly to the MPT. The complexity of the operations is not altered by switching to tree-based plans, as the number of nodes in a local tree-based plan is still linear in the number of the participating event types. In addition, the existence of a subtree T in an MPM can be tested in constant time (and an additional $O(\Sigma_{i=1}^n m_i)$ space) by hashing the subtrees upon creation. The complexity analysis of runtime evaluation detailed above also remains unchanged for the multitree model, with the exception of the cost function $\text{Cost}_{ord}^{multi}$ being replaced with $\text{Cost}_{tree}^{multi}$.

The local search process for MPMs functions as described for MPTs above. However, now it is possible for a pattern to share multiple disjoint subtrees. Consider a situation where one such subpattern $\hat{P}_1$ is already shared, and the optimizer attempts to share the second subpattern $\hat{P}_2$ during the local search step. In this case, consider two separate options: (1) the most efficient tree containing $\hat{P}_2$ regardless of the existing sharing of $\hat{P}_1$; and (2) the most efficient tree containing both $\hat{P}_1$ and $\hat{P}_2$. This case can be generalized to sharing q subtrees and considering the $(q+1)^{th}$ one. Due to this extension, $\mathcal{A}$ is required to support multiple subtrees. More formally, $\mathcal{A}$ is required to be capable of the following:

Given a pattern P and the statistical event characteristics Stat, return the cheapest local tree-based evaluation plan T subject to $\text{Cost}_{tree}$.

Given a pattern P, a set of tree-based plans γ for some subpatterns of P, and the statistics collection Stat, return the cheapest (subject to $\text{Cost}_{tree}$) local tree-based evaluation plan T containing all trees in γ as subtrees.

Algorithms for tree-based plan generation satisfying the above requirements are discussed in, e.g., I. Kolchinsky and A. Schuster. Join query optimization techniques for complex event processing applications. PVLDB, 11(11):1332-1345, 2018; Y. Mei and S. Madden. ZStream: a cost-based query processor for adaptively detecting composite events. In SIGMOD Conference, pages 193-206. ACM, 2009.

When selecting the next state to be returned, the neighborhood functions will randomly choose whether existing shared subtrees should be preserved for the patterns involved. For $\mathcal{N}_{vertex}^k$, this decision will be performed independently for each of the k patterns sharing a common subpattern. To apply this modification, sharing information must be stored for each pattern in the MPG, which adds a memory requirement of $O(n \cdot \max_i(|\mathcal{E}|))$. No further changes to the structure and the operations of the MPG are necessary for the tree-based evaluation model.

Experimental Evaluation

The present inventors have conducted an experimental evaluation to assess the overall system performance achieved by the present approach, as compared to the state-of-the-art methods for MCEP, and analyze the impact of the various parameters on the quality of the generated global plans.

6.1 Experimental Setup

Two independent datasets were used in the experiments. The first was taken from the NASDAQ stock market historical records [65]. Each data record represents a single update to the price of a stock, spanning a 1-year period and covering over 2100 stock identifiers with prices periodically updated. The input stream contained 80,509,033 primitive events, each consisting of a stock identifier, a timestamp, and a current price. The event format was also augmented with the precalculated difference between the current and the previous price of each stock. Updates of each stock identifier are considered as events belonging to a separate type.

The structure of the patterns in the workloads generated for this dataset was motivated by the problem of monitoring the relative changes in stock prices. Each pattern represented either a sequence or a conjunction of a number of event types and included a number of predicates, roughly equal to half the pattern size, comparing the difference attributes of two of the involved event types. In addition, about 20% of the patterns contained either a negation or a Kleene closure operator on some event type. As discussed above, the aforementioned combinations of pattern operators are sufficient to cover the whole spectrum of pattern structures. For example, a typical sequence pattern of size 3 is as follows:

$P_1 : SEQ(MSFT, \text{Kleene } (GOOG), APPL); C_1 = \{MSFT.diff < APPL.diff\}$.

The second dataset contains the vehicle traffic sensor data, provided by the city of Aarhus, Denmark [6] and collected over a period of 4 months from 449 observation points, with 13,577,132 primitive events overall. Each event represents an observation of traffic at the given point. The attributes of an event include, among others, the point ID, the average observed speed, and the total number of observed vehicles during the last 5 minutes. The patterns created for this dataset followed the rules specified above and were motivated by normal driving behavior, where the average speed tends to decrease with the increase in the number of vehicles on the road. The user-defined task is detecting the violations of this model, that is, combinations of three or more observations with either an increase or a decline in both the number of vehicles and the average speed.

Unless stated otherwise, all arrival rates and predicate selectivities were calculated in advance during the preprocessing stage. The measured arrival rates varied between 2 and 47 events per second, and the selectivities ranged from 0.003 to 0.92.

The workloads were created by grouping the patterns generated as described above based on a set of parameters, including the number of patterns in a workload, average pattern size (number of event types in a pattern), and pattern time window. Unless stated otherwise, the default values were set to 100 patterns per workload, an average pattern size of 5 event types, and the time window of 15 minutes.

Unless stated otherwise, all experiments were conducted on the full version of the present MCEP optimizer presented above. The default local search time limit for all algorithms was set to 180 seconds. The algorithm used as the local plan generation algorithm $\mathcal{A}$ is based on dynamic programming described in I. Kolchinsky et al., "Join query optimization techniques for complex event processing applications." PVLDB,11(11):1332-1345, 2018.

Throughput, defined as the number of events processed per second during pattern detection, was selected as the main performance metric. However, similar results could be obtained for algorithms targeting any other optimization goal, such as minimizing latency, power consumption, or communication cost.

All experiments were repeated on 10 independently generated workloads, and the displayed results were averaged among all trials. All models and algorithms were implemented in Java. The experiments were run on a machine with 2.20 Ghz CPU and 16.0 GB RAM.

Experimental Results—Impact of Input Parameters on System Performance

Figure 10B:
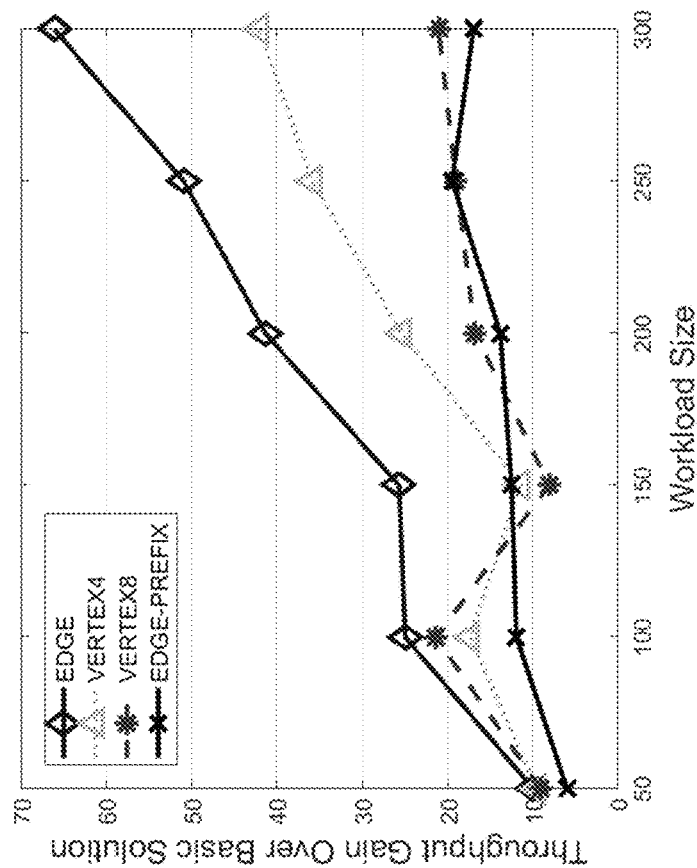
FIGS. 10A-14D show experimental results, in accordance with some embodiments of the present invention.
Figure 10A:
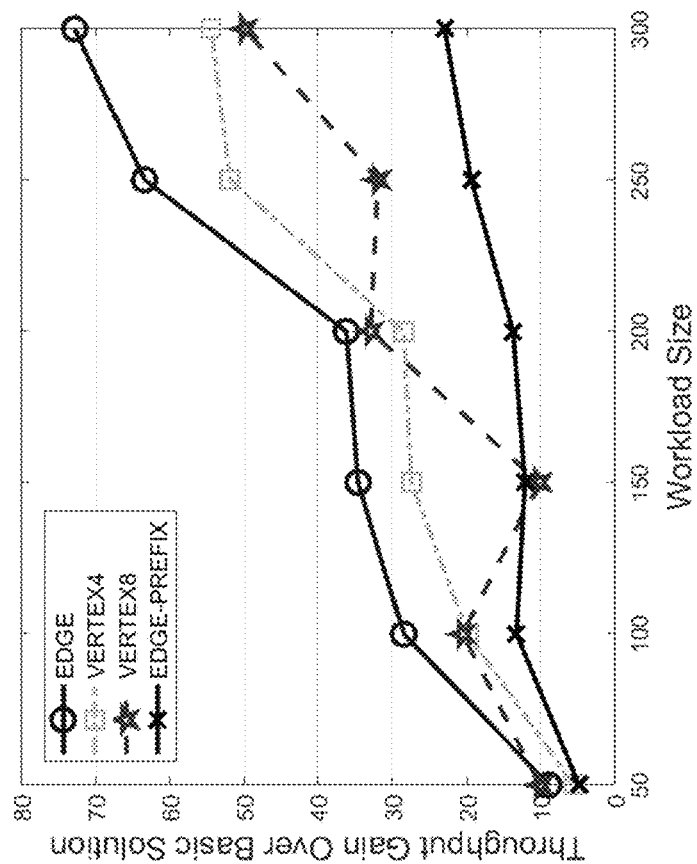
Figure 10D:
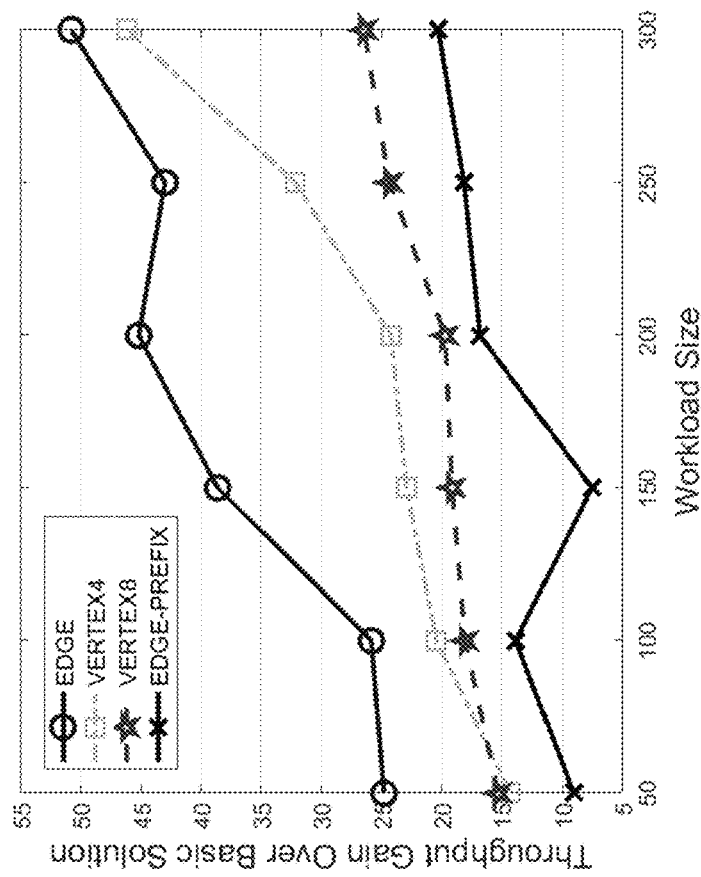
Figure 10C:
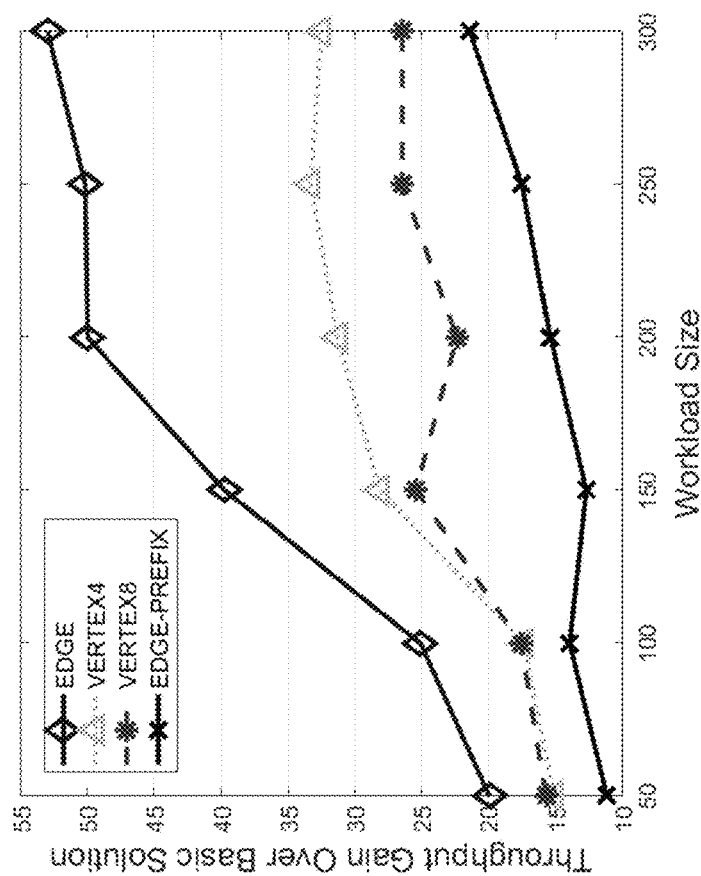

The first experiment evaluated the performance of the local search algorithms described above, as a function of the workload size. FIG. 10 shows throughput gain as a function of the workload size for different combinations of a meta-heuristic, a neighborhood function, a subexpression sharing strategy, and a dataset: FIG. 10A depicts stocks dataset, simulated annealing; FIG. 10B depicts stocks dataset, Tabu search; FIG. 10C depicts traffic dataset, simulated annealing; and FIG. 10D depicts traffic dataset, Tabu search.

Here and in all subsequent experiments, the graphs show the relative throughput gain over the trivial global evaluation plan, utilizing no sharing and no rewriting techniques. The neighborhoods $\mathcal{N}_{edge}$, $\mathcal{N}_{vertex}^4$, and $\mathcal{N}_{vertex}^8$ were tested in conjunction with simulated annealing and Tabu search meta-heuristics on stock (FIGS. 10A-10B) and traffic (FIGS. 10C-10D) datasets. For $\mathcal{N}_{edge}$ alone, the prefix-only version of the present framework was evaluated in addition to the default arbitrary-subset version.

Overall, all combinations demonstrated more significant throughput gains for larger workloads, ranging from a factor of 21 to over 72. Despite being the simplest, $\mathcal{N}_{edge}$ neighborhood showed the best results, finding evaluation plans that outperformed the trivial plan by a factor of up to 72.7 for the stock dataset and up to 50.7 for the traffic dataset. This can be explained by the overwhelming size of the neighbor spaces explored by $\mathcal{N}_{vertex}^4$ and $\mathcal{N}_{vertex}^8$. Tight time constraints prevent the system from locating the best optimization opportunities in huge neighborhoods. Thus, although $\mathcal{N}_{vertex}$ neighborhoods contain all of the moves in $\mathcal{N}_{edge}$, the better moves are statistically harder to reach before the time expires. Comparable performance was observed for both meta-heuristics, with simulated annealing slightly outperforming Tabu search for the stock dataset and vice versa for the traffic dataset.

The choice of a subexpression sharing strategy was found to have a major impact on the system performance. When the optimizer was restricted to only consider sharing prefixes, applying the generated plans resulted in up to 5 times lower throughput (marked as 'EDGE-PREFIX' in all graphs) as compared to the plans produced using an identical setup without the above limitation (marked as 'EDGE'). This observation fully matches prior analysis. As discussed above, a prefix-only approach ignores a significant fraction of the space of possible optimizations and limits a pattern to only sharing a single subexpression by utilizing order-based local plans as opposed to tree-based ones.

Figure 11B:
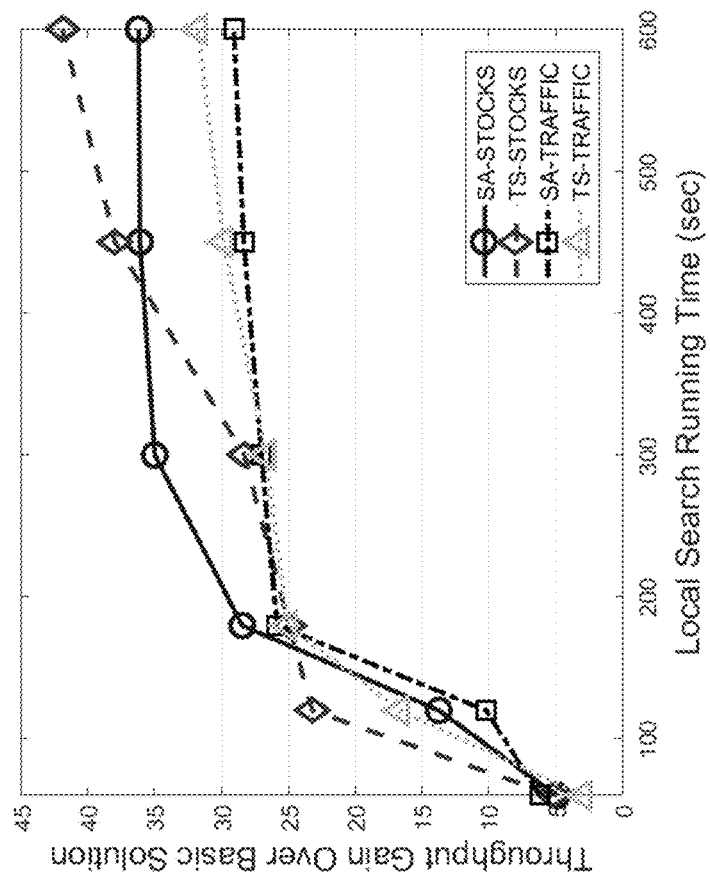
Figure 11A:
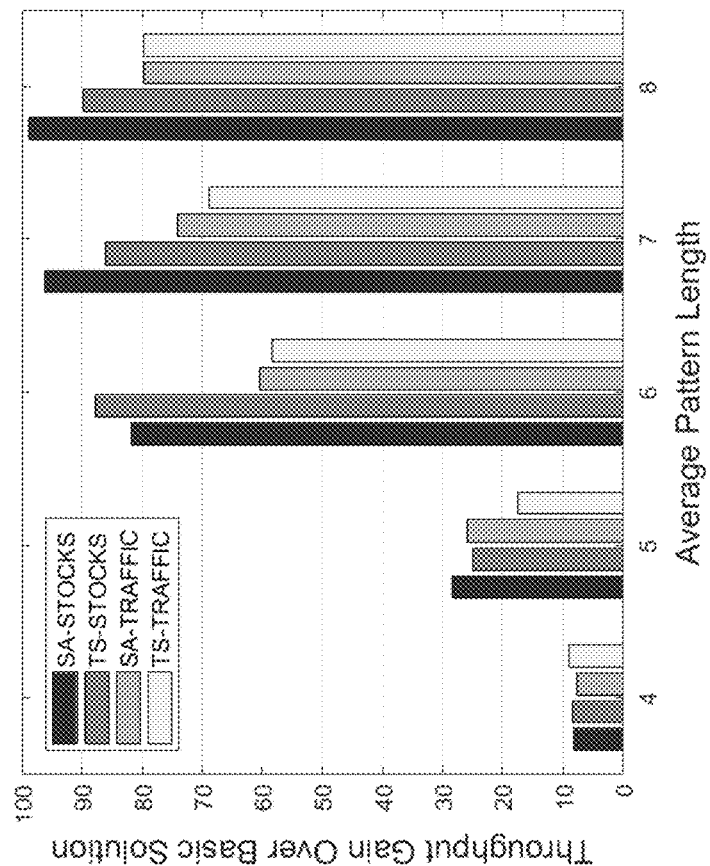

The scalability of the present optimizer was further assessed as subject to various parameters (FIGS. 11A-11d). Simulated annealing (marked as 'SA' in the graph) and Tabu search (marked as 'TS') were again evaluated on both datasets in conjunction with the best-performing neighborhood $\mathcal{N}_{edge}$. FIG. 11A depicts the throughput gain as a function of the average length of a pattern in a workload. The present approach seems to improve even more for longer patterns, speeding up the event processing by up to two orders of magnitude. This is not surprising, as longer patterns introduce more optimization opportunities. It was also observed that in most cases the simulated annealing meta-heuristic achieved better performance than Tabu search.

Unsurprisingly, the output plan quality also improves with increased time limit of the local search algorithm (FIG. 11B). Interestingly, the performance of simulated annealing seems to converge to a constant value, while Tabu search keeps improving for longer time limits. This can be explained by the distinctive behavior of the former after a large number of iterations, when the current threshold becomes small enough for the algorithm to converge to a local minimum.

The results obtained for different time window sizes (FIG. 11C) demonstrate similar trends. Since the cost function and the overall system throughput strictly depend on this parameter, increasing it leads to bigger differences in plan qualities, both calculated and empirically observed.

Finally, an experiment with patterns utilizing count-based windows was conducted. As opposed to specifications based on time-based windows defined above, count-based patterns require a match to appear within the last W arrived events rather than within Wtime units.

Figure 11D:
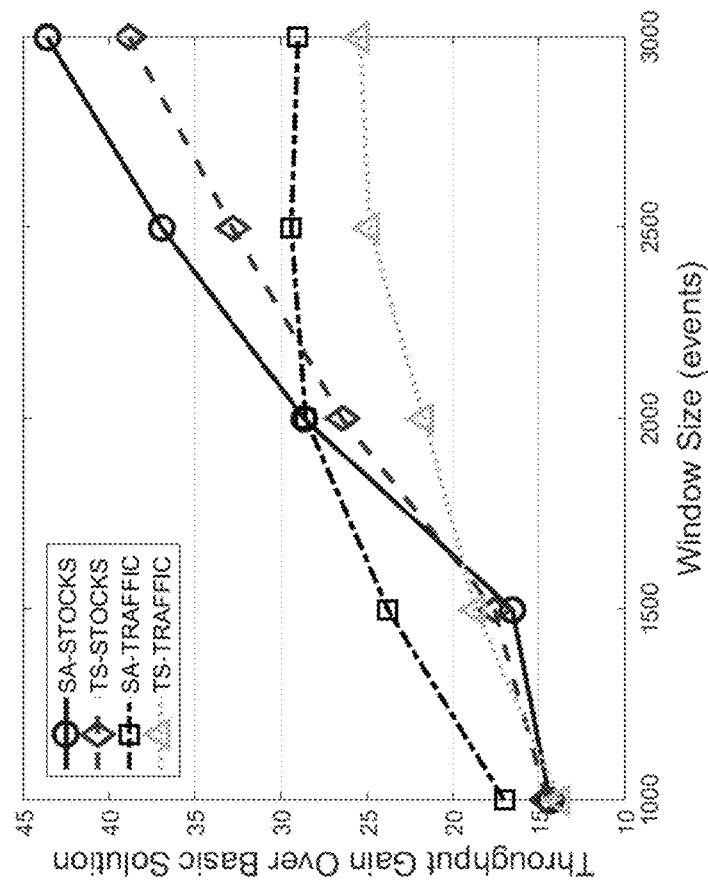
Figure 11C:
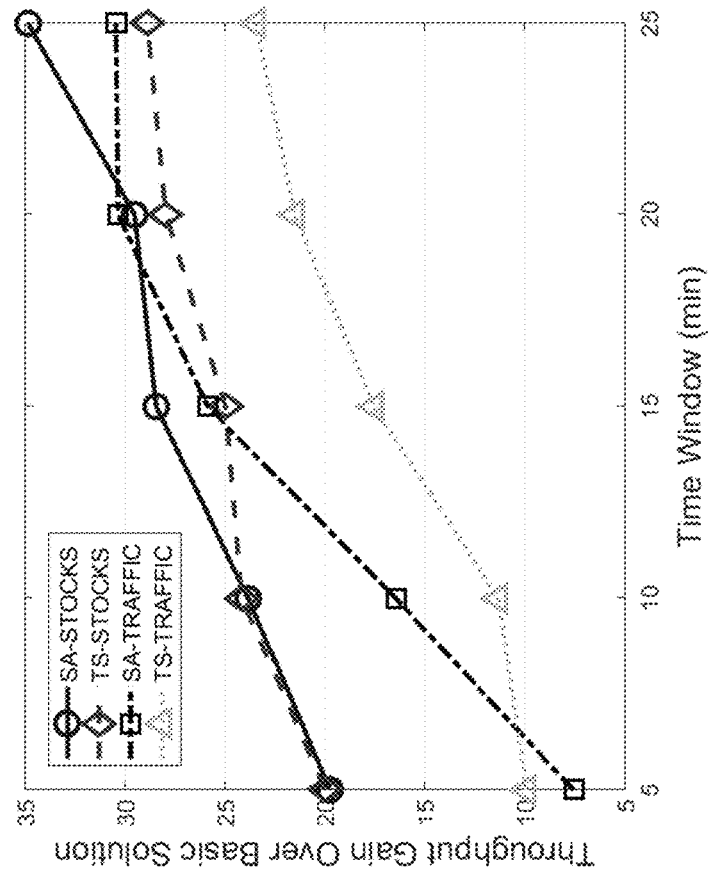
Figures 12A, 12B:
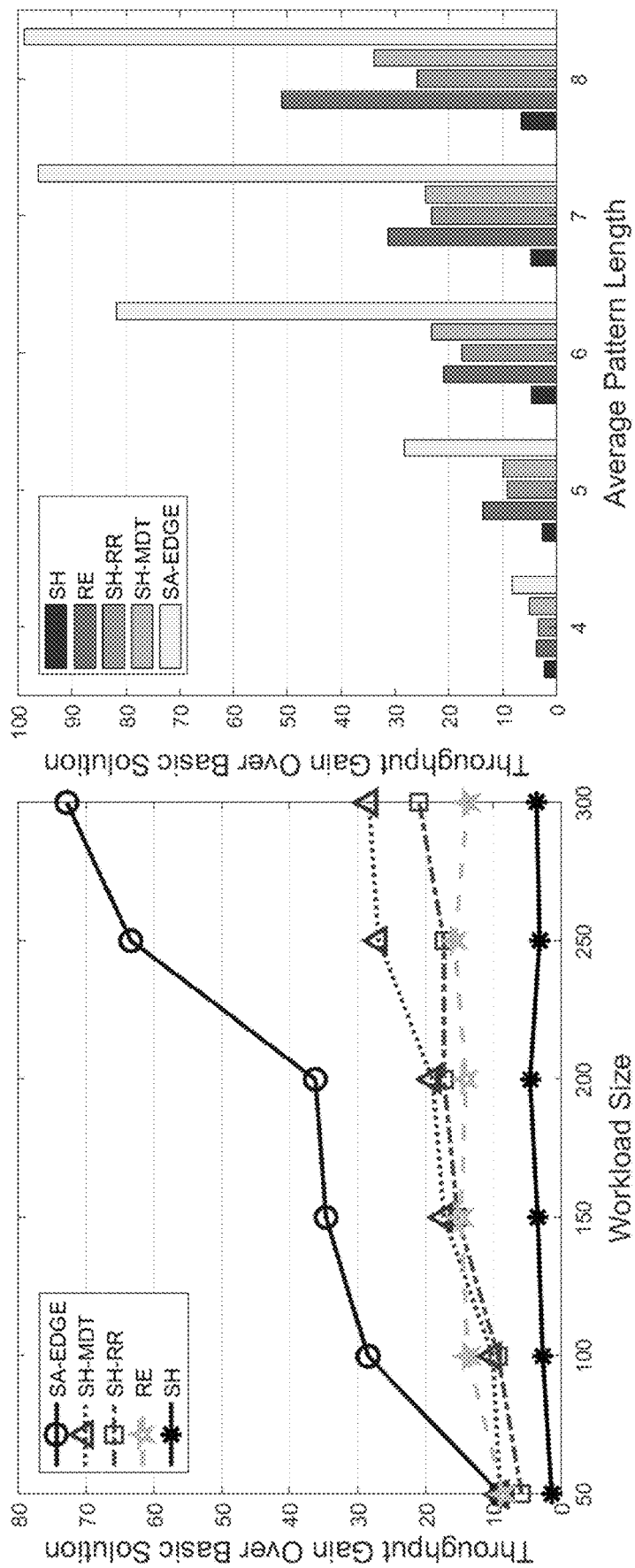
Figures 12C, 12D:
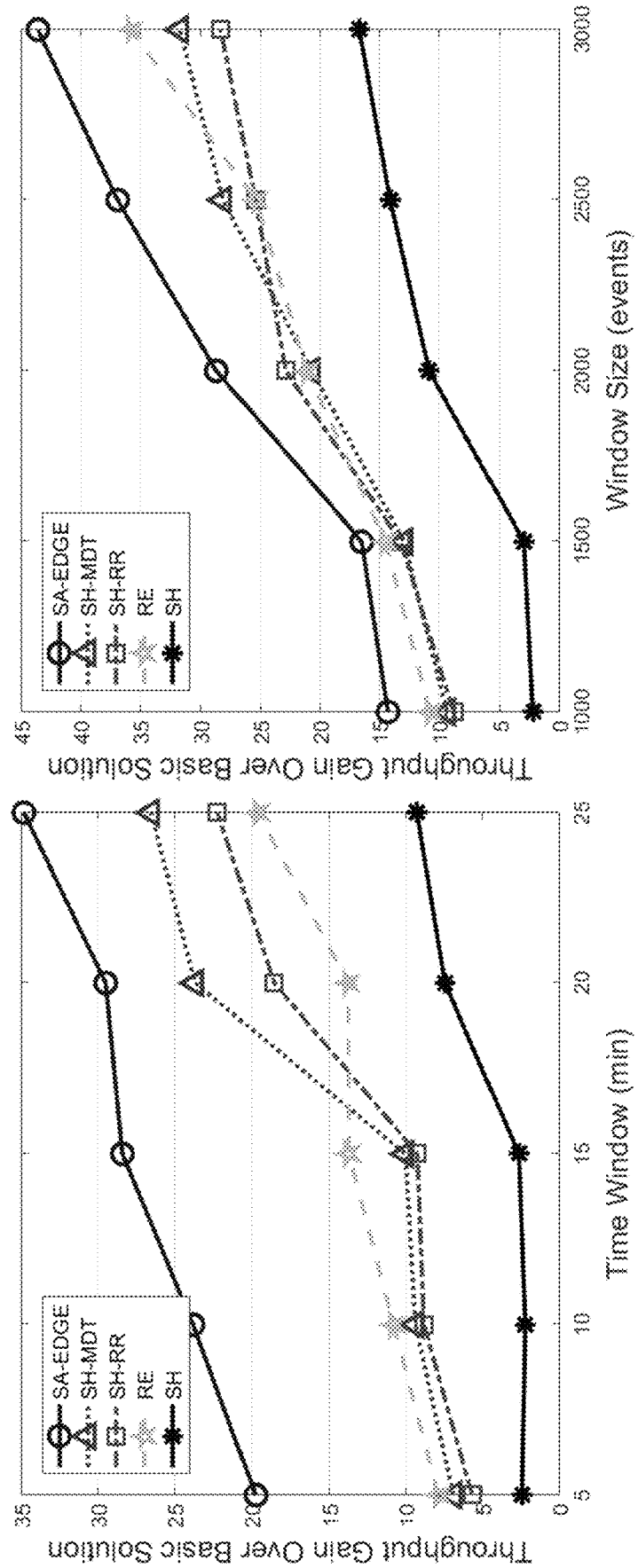
Figure 12E:
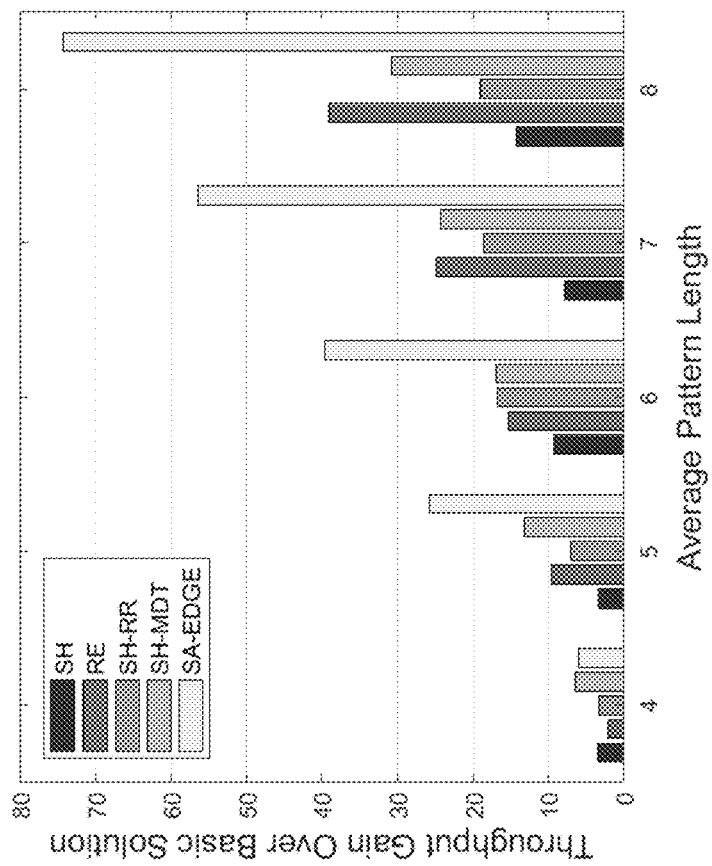
Figure 12F:
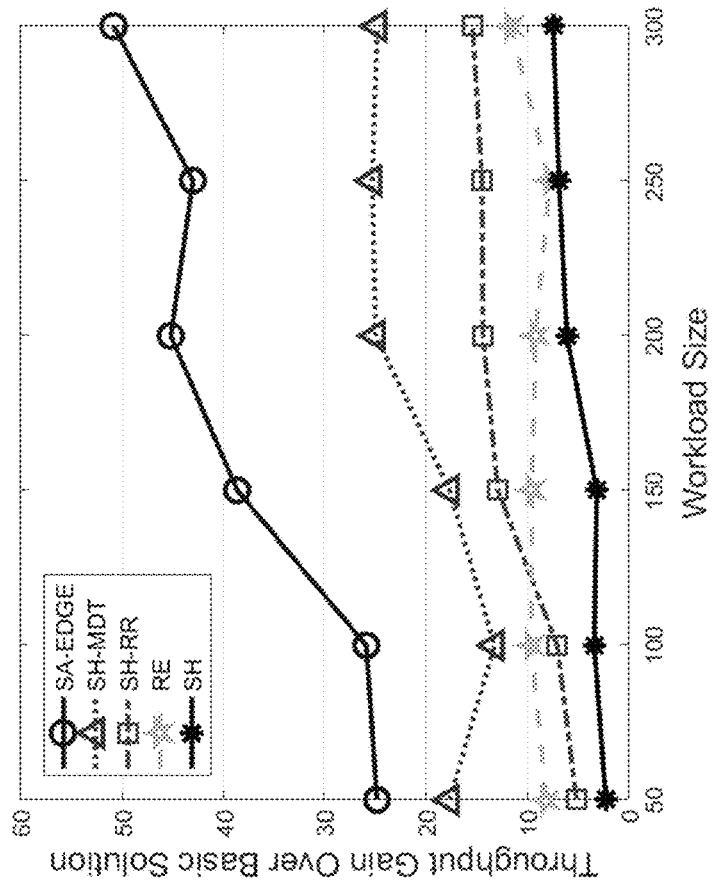
Figures 12G, 12H:
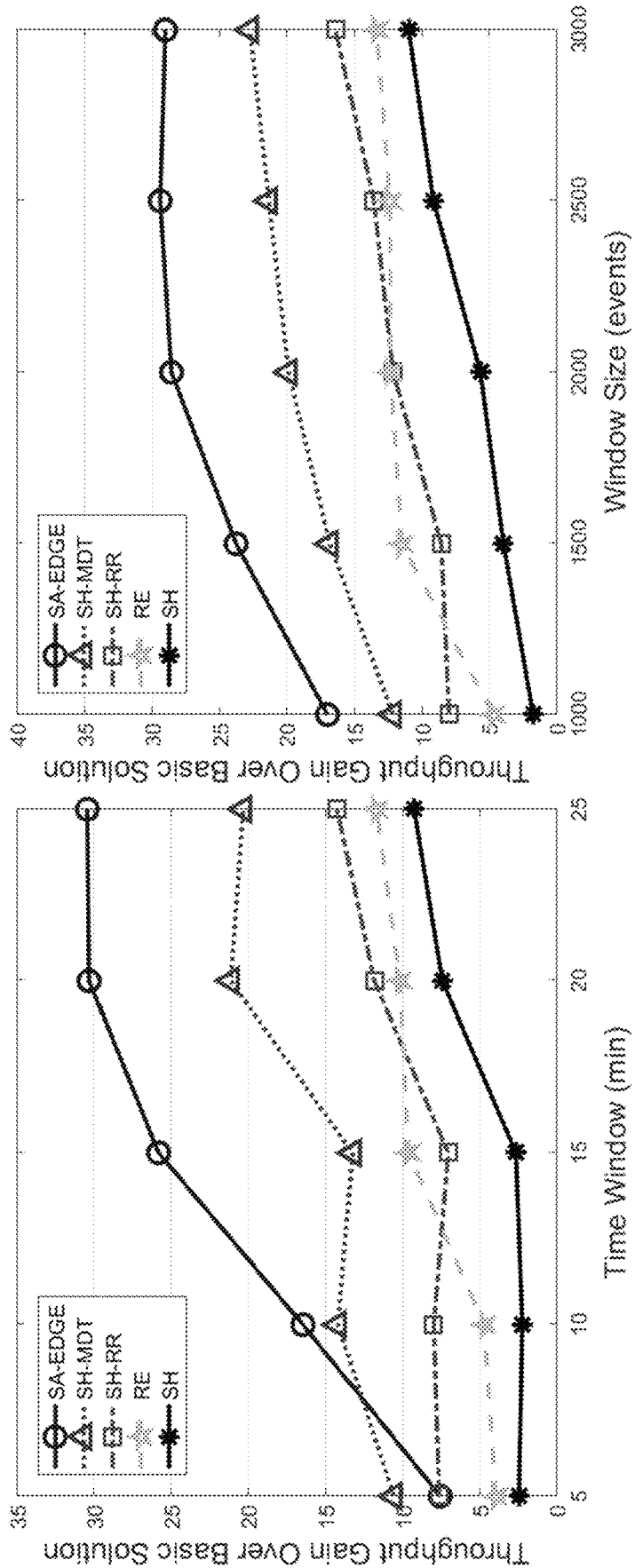

FIG. 11D presents the results. For the stock dataset, even bigger performance boost was observed for larger windows as compared to the time-based scenario. This can be explained by the highly fluctuating event arrival rates exhibited by this dataset. When time-based windows are used, the peak load is only experienced during brief 'bursts', whereas large count-based windows cause the system to be constantly overloaded. Since the performance gain achieved by an efficient evaluation plan is proportional to the average system load, the latter case demonstrates a more significant increase in total throughput. In contrast, the results for the traffic dataset were extremely similar to those obtained for time-based windows due to much less skew in event distribution over the input stream.

Experimental Results—Comparison with Known Methods

The experiments summarized in FIGS. 10 and 11 were repeated for the basic sharing and the basic reordering methods, as well as for other known MCEP methods.

The basic sharing method (SH) refers to the maximal subexpression sharing technique discussed above. The basic reordering method (RE) greedily rebuilds the event sequence by picking the event type maximizing the cost function at each step.

The SPASS method (see M. Ray et al., "Scalable pattern sharing on event streams", In Proceedings of the 2016 International Conference on Management of Data, pages 495-510, New York, NY., USA, 2016. ACM) selects the sub-patterns to share according to a metric called 'redundancy ratio.' This method metric represents the potential gain in sharing its computation. Each subexpression is assigned a score, and the winners are chosen by approximating the well-known minimal substring cover problem. The MOTTO method (see S. Zhang et al. "Multi-query optimization for complex event processing in SAP ESP.", In 33rd IEEE International Conference on Data Engineering, ICDE 2017, San Diego, CA, USA, April 19-22, 2017, pages 1213-1224, 2017) utilizes a combination of techniques referred to as MST (merge sharing technique), DST (decomposition sharing technique), and OTT (operator transformation technique). The system solves the directed Steiner minimum tree problem to select the best global plan produced using the above techniques.

FIGS. 12A-12H present the results. The redundancy ratio method and the merge-decomposition technique are marked as SH-RR and SH-MDT respectively. While both SH-RR and SH-MDT scale well with growing workload size (FIGS. 12A, 12E) and average pattern length (12B, 12F), the present optimizer achieves the best overall speedup, in some cases up to three times better than that of the runner-up solution.

This result follows from utilizing the reordering opportunities, which were shown to drastically boost CEP evaluation. On the other hand, the present approach also attempts to exploit sharing opportunities when possible, which allows it to outperform the pure reordering algorithm (RE) for large pattern sizes. The gaps were closer for time window evaluation (FIGS. 12C and 12G), with SA-EDGE still achieving an advantage of at least 25% over the second-best method. The results for count-based windows (FIGS. 12D and 12H) strictly follow the trends described for FIG. 11.

Experimental Results—Adaptive System Behavior

Next, the performance of the present system was evaluated in the presence of a dynamically changing input stream. For this experiment alone, semi-synthetic input was used. A component was implemented that accepts a parameter x and randomly and independently transforms every x incoming events before they are received by the evaluation mechanism. A transformation is performed by randomly picking y event types, creating their random permutation P and then replacing the type attribute of every affected event with the one following its value in P. This modification allows to simulate rapid and drastic changes in the arrival rates of all types of events.

Figures 13A, 13B:
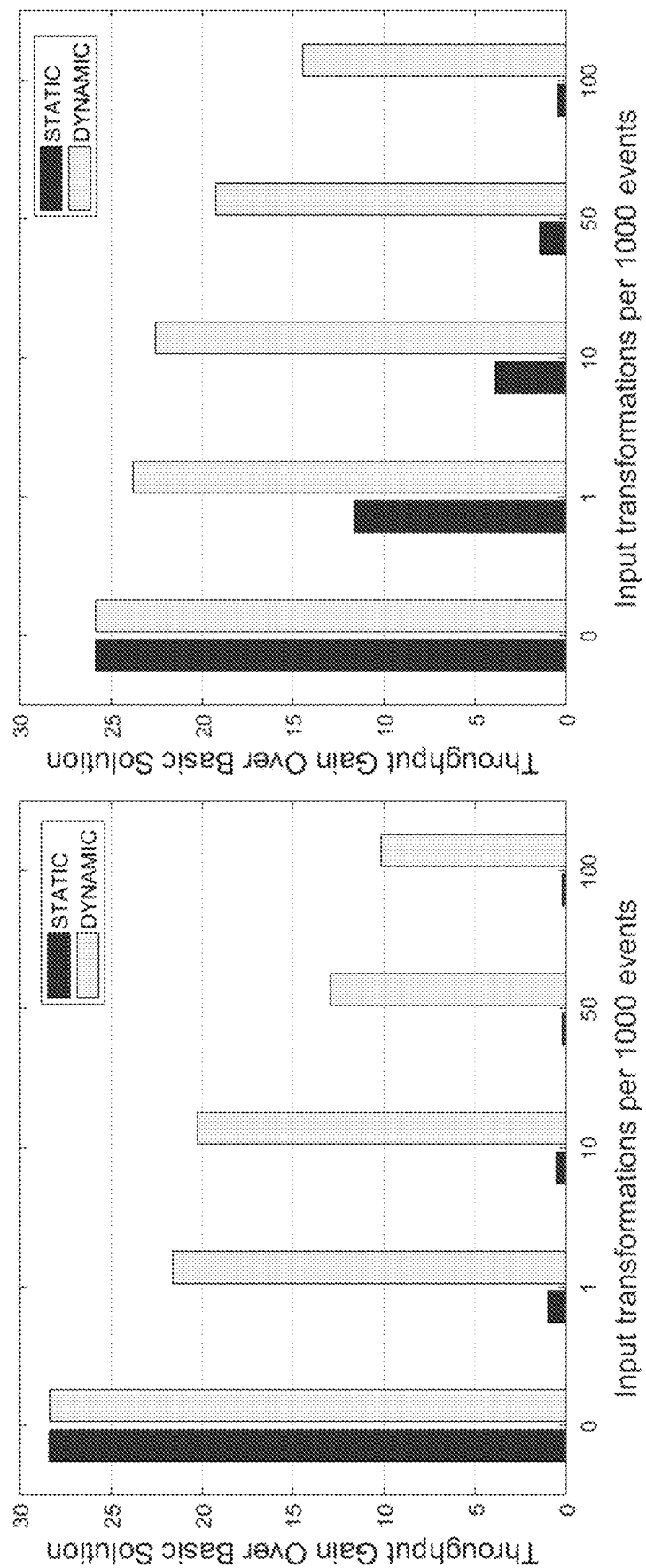
Figure 14A:
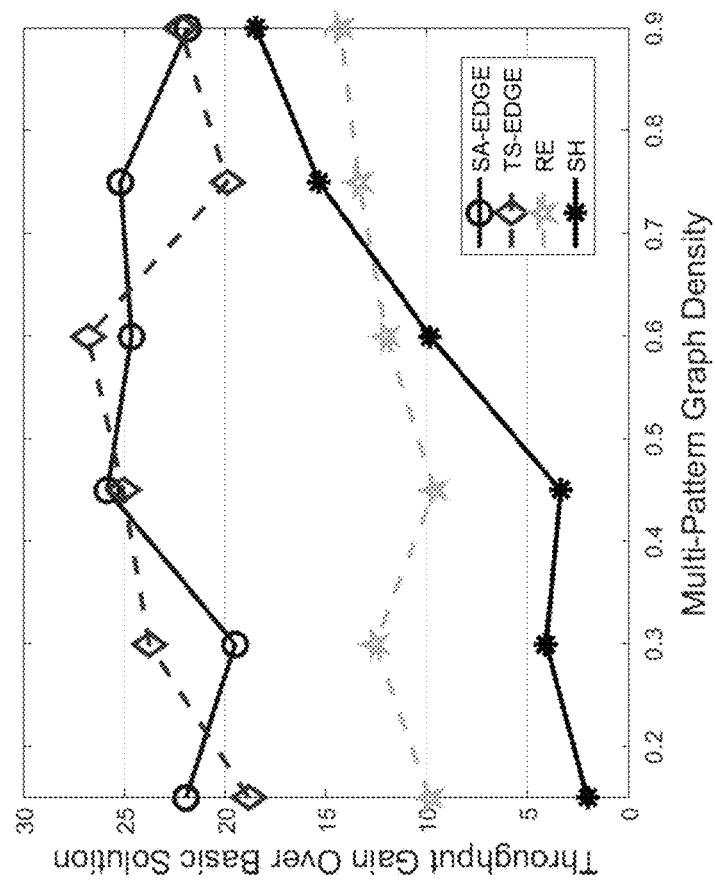
Figure 14B:
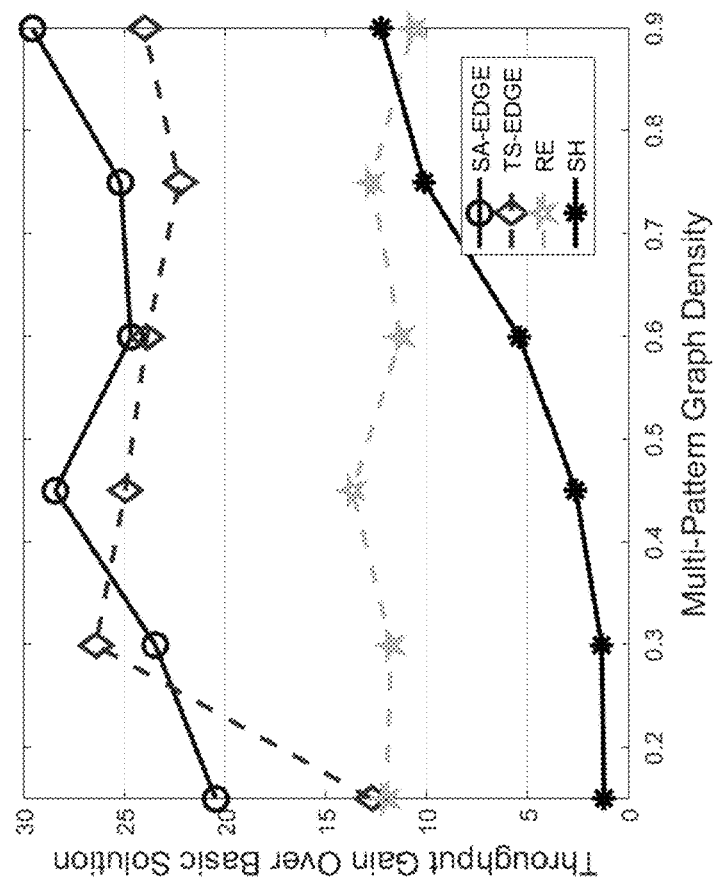
Figure 14D:
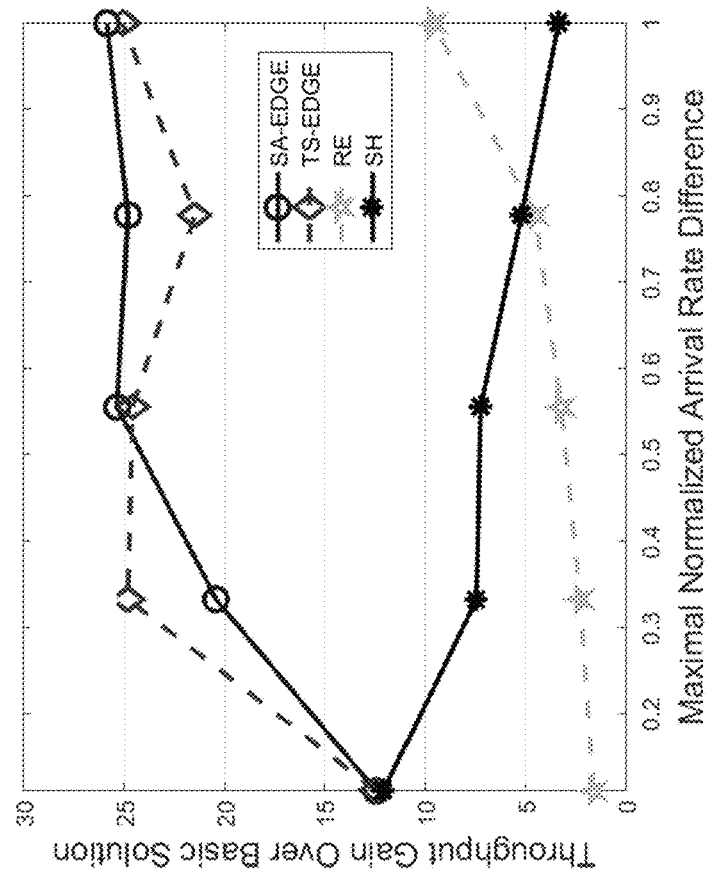
Figure 14C:
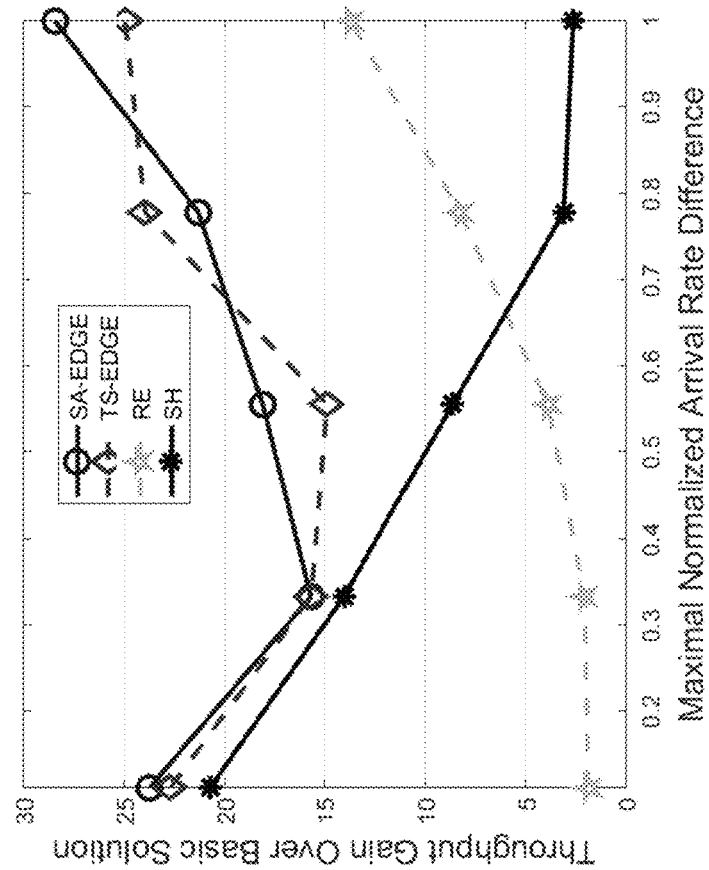

The experiment was repeated for y=5 and x ranging between 10 and 1000 on the static and the dynamic version of the present framework. In the static case, an evaluation plan was created on startup and used exclusively regardless of input changes. The dynamic version utilized an adaptive approach, restarting the plan calculation process when a drastic change in the statistics is detected. The results are depicted in FIGS. 13A-13B. Unsurprisingly, the initially generated plan fails to perform adequately when the input characteristics overcome on-the-fly changes. While extremely frequent input changes clearly reduce system performance, the adaptive method still leads to at least 10 times higher throughput.

Additional Experiments

Further experiments were conducted to study the influence of the workload statistical characteristics on the performance of the present optimizer. Only the best performing (according to the results presented above) combinations SA-EDGE and TS-EDGE were evaluated.

The statistical characteristics of workload generation are controlled using a pair of configurable parameters, multi pattern graph density and normalized arrival rate difference. The multi-pattern graph density is defined as an average relative number of neighbors of a given pattern in an MPG. For example, in a workload of 100 patterns with MPG density equal to 0.5, each pattern will have 50 neighbors on average. This parameter is used to control the sharing sensitivity of a workload.

The arrival rate difference, defined as the maximal difference in rates of two event types within a single pattern, allows to manipulate the reordering sensitivity of a workload. For example, for an unconditional conjunction of 5 event types arriving at an identical rate, each of the possible 5! evaluation orders will have the same cost. However, if one of the types appears 100 times more frequently than the rest, the gain obtained by postponing the costly event type to the last state is considerably high. Patterns with varying degrees of reordering sensitivity are produced by limiting the selection of the event types for a pattern accordingly. The values of this parameter were normalized with respect to the maximal observed difference of 45.

FIGS. 14A-14D depict the achieved throughput gain as a function of the sharing sensitivity (FIGS. 14A-14B) and the reordering sensitivity (FIGS. 14C-14D) of the workload. The plots also show the performance of the basic reordering (RE) and the basic sharing (SH) methods discussed above.

The high gains of the local search methods do not exhibit dominant dependencies on either of the two parameters. While larger graph densities and rate difference limits introduce more sharing and reordering opportunities, they also increase the search space size and the number of potential local minima. Nevertheless, the present approach consistently outperforms the better of SH and RE for every attempted experimental configuration. At the extremes, local search tends to resort to an almost pure sharing plan for low arrival rate differences (since virtually no improvement can be achieved by reordering), whereas for sparse multi-pattern graphs the solution assigning the best local plan to all patterns is often preferred.

The basic reordering method becomes more efficient with increasing differences in arrival rate and is almost unaffected by the changes in graph density. The performance of the basic sharing method increases monotonically with graph density. It also decreases with the rate difference due to the smaller number of participating event types in more restricted workloads. Given a pair of workloads of the same size containing patterns of the same length, the workload with fewer event types will have more events of the same type on average, and is expected to offer more sharing opportunities.

Efficient Implementation of the Multi-Pattern Graph

As presented above, the multi-pattern graph for the workload $WL=\{P_1, \ldots, P_n\}$ is defined as MPG=(V, E), where $E=\{e_i=(v_i, v_j, \Gamma_{ij}\neq\emptyset\}$ and $V=\{v_i|P_i\in WL\}$.

This formulation introduces potential performance issues. First, explicitly storing the set of common subpatterns $\Gamma_{ij}$ requires $O(2^s)$ memory, where s is the size of the maximal common subpattern. This can be solved by only storing the $MP_{ij}$ instead, as the rest of the common subpatterns can be inferred from it. Second, when m patterns share the same subpattern, the MPG will contain $$\binom{m}{2}$$

edges representing the same subpattern set. Consequently, directly instantiating the MPG in memory would be extremely inefficient.

The present disclosure addresses this shortcoming by compact graph representation. Rather than explicitly store the vertices and the edges, for every distinct maximal common sub-pattern MP of some set of patterns $\Gamma$, $\Gamma$ is kept in a hash table with MP as a key. In addition, a second hash table maps a single pattern P to a list of maximal common subpatterns with its peers in MPG. This data structure still contains all the necessary information, additionally providing near constant cost of retrieval and worst case linear cost of addition and deletion of patterns. The space occupied by both hash tables is $O(n\cdot\gamma)$, where $\gamma$ is the total number of distinct maximal common subpatterns in the workload. While the value of $\gamma$ can reach $n^2$ in the worst case (and even exceed it in some cases), the way in which the hash tables are constructed makes it extremely unlikely for the space complexity to surpass $O(n^2)$.

Another potential performance bottleneck associated with the MPG is the resource-consuming operation of calculating the maximal common subpatterns for all pairs of patterns. Accordingly, the following simple and efficient implementation will be utilized. Given $P_i=(\mathcal{E}_i, S_i, C_i, W_i)$ and $P_j=(\mathcal{E}_j, S_j, C_j, W_j)$, first a simple set intersection $\mathcal{E}_{ij}$ of $\mathcal{E}_i$ and $\mathcal{E}_j$ is calculated. Then, the conditions in $C_i$ and $C_j$ is projected on $S_{ij}$, and the resulting condition sets are compared. If the sets are not equal, their intersection is calculated and $\mathcal{E}_{ij}$ reduced accordingly. The same procedure is then performed for $S_i$ and $S_j$. Overall, the worst-case complexity of this operation is $O(\max(|\mathcal{E}_i|, |\mathcal{E}_j|)+\max(|C_i|, |C_j|))$.

Note that multiple maximal common subpatterns may exist. For example, both SEQ(A,B) and SEQ (A, C) are the maximal intersections of the sequences SEQ (A, B, C) and SEQ(A,C,B). In this case, the MPG will store a list of maximal common subpatterns.

The worst-case complexity of computing all maximal common subpatterns is then $O(n^2 \cdot (s_{max}+c_{max}))$, where $s_{max}$ and $c_{max}$ denote the maximum sizes of a pattern in terms of events and conditions, respectively.

Local Search Meta-Heuristics

In some embodiments, local search meta-heuristics, simulated annealing and Tabu search are used herein.

Simulated annealing extends the functionality of iterative improvement by also allowing limited non-improving moves. A threshold $c_k$ is defined for each step. When a better neighbor solution is selected, it is chosen to replace the current solution, in a manner similar to the iterative improvement algorithm. If the neighbor solution is more expensive, it is accepted with probability $$\exp\left(-\frac{\Delta f}{c_k}\right),$$

where $\Delta f$ is the difference between the costs of the old and the new solutions. The thresholds are chosen such that $c_k=\alpha \cdot c_{k-1}$, $\alpha<1$. The algorithm starts with a sufficiently large $c_0$ and terminates when a predefined small value $c_k$ is reached. Before the start of the actual search, $c_0$ is set to the largest difference observed during evaluation of I neighbors of $s_{init}$. In the experiments detailed above, $\alpha=0.99$ and $I=10^3$ neighbors were used for setting the initial threshold.

Tabu search explores L random neighbors during each step and moves to the cheapest of them. Visiting the same state twice is prohibited. To enforce that, previously visited solutions are stored in a dedicated tabu list. The tabu list has a finite capacity C: when the number of stored solutions reaches C, oldest stored solutions are removed. The best solution s*observed during the run of the algorithm is returned. A memory list of capacity $C=10^4$ and $L=100$ was used during this experimental evaluation.

Both algorithms stop after reaching a predefined number of steps since the last improvement to s*or when the time expires. To study the tradeoff between evaluation time and solution quality, only the timestamp-based stop condition was implemented.

Formal Definition of M-MCEP

The cost function and the optimization problem of multitree-based MCEP are formally define.

First, the cost function is extended. Let $T_i$ denote a local tree-based evaluation plan for a pattern $P_i$. Next, the cost function definition for tree-based plans is borrowed from (Kolchinsky [2018]). For a plan $T_i$, $Cost_{tree}(T) = \Sigma_{N \in nodes(T)} C(N)$, are defined where $$C(N) = \begin{cases} W_i \cdot r_j & N \text{ is a leaf representing } E_j \\ C(L) \cdot C(R) \cdot sel_{L,R} & N \text{ is an internal node with child nodes } L \text{ and } R. \end{cases}$$

Here, $sel_{L,R}$ denotes the total selectivity of all conditions defined between the event types in L and R.

The extension of $Cost_{tree}$ for multitrees will be defined by counting the individual costs of all nodes in a multitree:

$$Cost_{tree}^{multi}(MPM) = \sum_{N \in nodes(MPM)} C(N).$$

Given a tree-based plan T and a multi-pattern multitree MPM, it is said that $T \in MPM$ if and only if MPM contains a subtree identical to T. A subtree of the MPM will be denoted corresponding to a pattern $p_i$ as $\mathcal{T}_i$. In addition, $TREE_P$ will denote the set of all tree-based plans of a pattern P. The extended optimization problem will be subsequently defined as follows:

Multitree-based multi-pattern CEP optimization problem (M-MCEP). Given a workload WL of n patterns and a statistics collection Stat, find a multi-pattern multitree MPM minimizing the value of $Cost_{tree}^{multi}$(MPM, WL, Stat) subject to $\forall P_i, 1 \leq i \leq n: \exists T \in TREE_P s.t. T \in MPM.$ Since T-MCEP can be viewed as a particular case of M-MCEP (restricted to left-deep trees as local plans), the complexity results obtained for T-MCEP hold for M-MCEP by generalization.

To justify the use of $\mathcal{N}_{edge}$ and $\mathcal{N}_{vertex}^k$ for MPM-based solution space, an observation similar to the one presented in Theorem 1 is utilized.

Theorem 2. Let $MPM_{opt}$ be the optimal multi pattern multitree for some workload W. For each tree $\mathcal{T}_i$ in $MPM_{opt}$ corresponding to the pattern $P_i$, let $\mathcal{S}_i$ denote the set of subtrees that are shared with other patterns in $MPM_{opt}$. Then, $\mathcal{T}_i$ is the most efficient local tree-based plan for $P_i$ out of those containing all the subtrees in $\mathcal{S}_i$.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a hardware processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figs. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. A system comprising:
    at least one hardware processor; and
    a non-transitory computer-readable storage medium having stored thereon program instructions, the program instructions executable by the at least one hardware processor to:
        receive, as input, a data stream representing events;
        receive, as input, a plurality of complex event patterns (CEPs), each representing an occurrence of a respective CEP in said data stream, wherein each of said CEPs comprises (a) a set of conditions reflecting relations among said events, and (b) a set of attributes associated with each of said events; and
        calculate an optimal multi-pattern evaluation plan corresponding to said plurality of CEPs, wherein said multi-pattern evaluation plan is created by:
            (i) generating an initial evaluation plan,
            (ii) reordering events in at least one CEP, to calculate modified versions of said initial evaluation plan,
            (iii) assigning a score to each of said modified versions based on a cost function, and
            (iv) selecting one of said modified versions having a highest said score as said optimal multi-pattern evaluation plan.

2. The system of claim 1, wherein reordering of said events in each of said CEPs comprises maximizing common sub-patterns among said CEPs, and wherein the at least one processor is further configured to share said common sub-patterns among all of said CEPs.

3. The system of claim 1, wherein said cost function minimizes a number of estimated intermediate results during an execution of said modified version.

4. The system of claim 1, wherein steps (ii) and (iii) are repeated iteratively based on one of: a specified time limit, and a specified number of iterations.

5. The system of claim 1, wherein said CEPs are based on user definition.

6. The system of claim 1, wherein said program instructions are further executable to execute said multi-pattern evaluation plan on said data stream, to generate output data.

7. A method comprising:
    receiving, as input, a data stream representing events;
    receiving, as input, a plurality of complex event patterns (CEPs), each representing an occurrence of a respective CEP in said data stream, wherein each of said CEPs comprises (a) a set of conditions reflecting relations among said events, and (b) a set of attributes associated with each of said events; and
    calculating an optimal multi-pattern evaluation plan corresponding to said plurality of CEPs, wherein said multi-pattern evaluation plan is created by:
        (i) generating an initial evaluation plan,
        (ii) reordering events in at least one CEP, method calculate modified versions of said initial evaluation plan,
        (iii) assigning a score to each of said modified versions based on a cost function, and
        (iv) selecting one of said modified versions having a highest said score as said optimal multi-pattern evaluation plan.

8. The method of claim 7, wherein reordering of said events in each of said CEPs comprises maximizing common sub-patterns among said CEPs, and wherein the at least one processor is further configured to share said common sub-patterns among all of said CEPs.

9. The method of claim 7, wherein said cost function minimizes a number of estimated intermediate results during an execution of said modified version.

10. The method of claim 7, wherein steps (ii) and (iii) are repeated iteratively based on one of: a specified time limit, and a specified number of iterations.

11. The method of claim 7, wherein said CEPs are based on user definition.

12. The method of claim 7, further comprising executing said multi-pattern evaluation plan on said data stream, to generate output data.

13. A computer program product comprising a non-transitory computer-readable storage medium having program instructions embodied therewith, the program instructions executable by at least one hardware processor to:
  receive, as input, a data stream representing events;
  receive, as input, a plurality of complex event patterns (CEPs), each representing an occurrence of a respective CEP in said data stream, wherein each of said CEPs comprises (a) a set of conditions reflecting relations among said events, and (b) a set of attributes associated with each of said events; and
  calculate an optimal multi-pattern evaluation plan corresponding to said plurality of CEPs, wherein said multi-pattern evaluation plan is created by:
    (i) generating an initial evaluation plan,
    (ii) method events in at least one CEP, to calculate modified versions of said initial evaluation plan,
    (iii) assigning a score to each of said modified versions based on a cost function, and
    (iv) selecting one of said modified versions having a highest said score as said optimal multi-pattern evaluation plan.

14. The computer program product of claim 13, wherein reordering of said events in each of said CEPs comprises maximizing common sub-patterns among said CEPs, and wherein the at least one processor is further configured to share said common sub-patterns among all of said CEPs.

15. The computer program product of claim 13, wherein said cost function minimizes a number of estimated intermediate results during an execution of said modified version.

16. The computer program product of claim 13, wherein steps (ii) and (iii) are repeated iteratively based on one of: a specified time limit, and a specified number of iterations.

17. The computer program product of claim 13, wherein said CEPs are based on user definition.

18. The computer program product of claim 13, wherein said program instructions are further executable to execute said multi-pattern evaluation plan on said data stream, to generate output data.

* * * * *